(12) United States Patent
Akmal et al.

(10) Patent No.: US 12,136,172 B2
(45) Date of Patent: Nov. 5, 2024

(54) DIGITAL ASSISTANT FOR PROVIDING VISUALIZATION OF SNIPPET INFORMATION

(71) Applicant: Apple Inc., Cupertino, CA (US)

(72) Inventors: Shiraz Akmal, Playa Vista, CA (US); Brad K. Herman, Culver City, CA (US); St John W. Colon, Los Angeles, CA (US); Viraaj M. Marathe, Los Angeles, CA (US); Isar Arason, Lilburn, GA (US); Scott M. Andrus, Lilburn, GA (US); Karan M. Daryanani, San Francisco, CA (US); Zihan Xu, Tarzana, CA (US); Ryan J. Quintana, Los Angeles, CA (US); David A. Carson, San Francisco, CA (US)

(73) Assignee: Apple Inc., Cupertino, CA (US)

(*) Notice: Subject to any disclaimer, the term of this patent is extended or adjusted under 35 U.S.C. 154(b) by 180 days.

(21) Appl. No.: 17/945,963

(22) Filed: Sep. 15, 2022

(65) Prior Publication Data

US 2023/0087244 A1 Mar. 23, 2023

Related U.S. Application Data

(60) Provisional application No. 63/245,749, filed on Sep. 17, 2021.

(51) Int. Cl.
*G06T 19/00* (2011.01)
*G06T 15/20* (2011.01)
(52) U.S. Cl.
CPC .......... *G06T 19/003* (2013.01); *G06T 15/20* (2013.01)

(58) Field of Classification Search
None
See application file for complete search history.

(56) References Cited

U.S. PATENT DOCUMENTS 10,026,209 B1 7/2018 Dagley et al.
10,339,714 B2 7/2019 Corso et al.
(Continued)

FOREIGN PATENT DOCUMENTS

EP 2940556 A1 11/2015
JP 2012-521039 A 9/2012
(Continued)

OTHER PUBLICATIONS

Müller et al., "A Taxonomy for Information Linking in Augmented Reality", AVR 2016, Part I, LNCS 9768, 2016, pp. 368-387.
(Continued)

*Primary Examiner* — Frank S Chen
(74) *Attorney, Agent, or Firm* — DLA Piper LLP (US)

(57) ABSTRACT

This relates generally to intelligent automated assistants and, more specifically, to provide intelligent visualization of snippet information. An example method includes receiving a user request and in response to receiving the user request, determining a response for the user request, determining a format for a visual representation of the response, identifying one or more virtual objects based on the format for the visual representation of the response, determining a size for each of the one or more virtual objects based on context information associated with the response, and displaying the one or more virtual objects within a background environment based on the size for each of the one or more virtual objects and geometry of the background environment.

57 Claims, 31 Drawing Sheets

(56) References Cited

U.S. PATENT DOCUMENTS

| | | | |
|---|---|---|---|
| 10,339,721 B1 | 7/2019 | Dascola et al. | |
| 2009/0058860 A1 | 3/2009 | Fong et al. | |
| 2012/0159321 A1 | 6/2012 | Rolleston et al. | |
| 2014/0310595 A1 | 10/2014 | Acharya et al. | |
| 2016/0026242 A1 | 1/2016 | Burns et al. | |
| 2016/0314341 A1* | 10/2016 | Maranzana | G06F 30/00 |
| 2017/0206797 A1* | 7/2017 | Solomon | G06N 3/006 |
| 2018/0045963 A1 | 2/2018 | Hoover et al. | |
| 2018/0225131 A1 | 8/2018 | Tommy et al. | |
| 2018/0300952 A1 | 10/2018 | Evans et al. | |
| 2020/0380053 A1* | 12/2020 | Boukari | G06F 16/9535 |

FOREIGN PATENT DOCUMENTS

| | | | |
|---|---|---|---|
| WO | 2001/33327 | A1 | 5/2001 |
| WO | 2004/042662 | A1 | 5/2004 |
| WO | 2007/032003 | A2 | 3/2007 |
| WO | 2014/008461 | A1 | 1/2014 |
| WO | 2016/118344 | A1 | 7/2016 |
| WO | 2018/014788 | A1 | 1/2018 |
| WO | 2018/090060 | A1 | 5/2018 |
| WO | 2020/096706 | A1 | 5/2020 |
| WO | 2020/208302 | A1 | 10/2020 |
| WO | 2021/061349 | A1 | 4/2021 |
| WO | 2021/062148 | A1 | 4/2021 |
| WO | 2021/188439 | A1 | 9/2021 |

OTHER PUBLICATIONS

Villemure et al., "The Dragon Drive Innovation Showcase: Advancing the State-of-the-art in Automotive Assistants", Retrieved from the Internet: http://essv2018.de/wp-content/uploads/2018/03/41_Villemure_ESSV2018.pdf, 2018, 7 pages.

International Preliminary Report on Patentability received for PCT Patent Application No. PCT/US2022/043871, mailed on Mar. 28, 2024, 10 pages.

International Search Report and Written Opinion received for PCT Patent Application No. PCT/US2022/043871, mailed on Jan. 2, 2023, 13 pages.

* cited by examiner

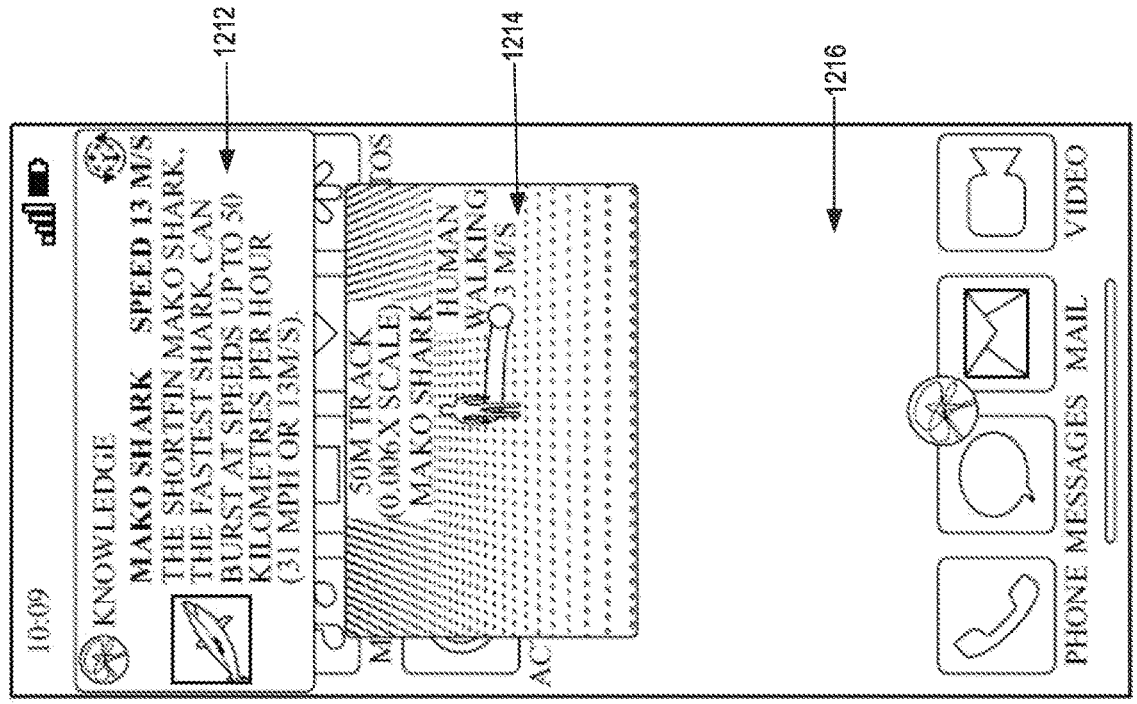
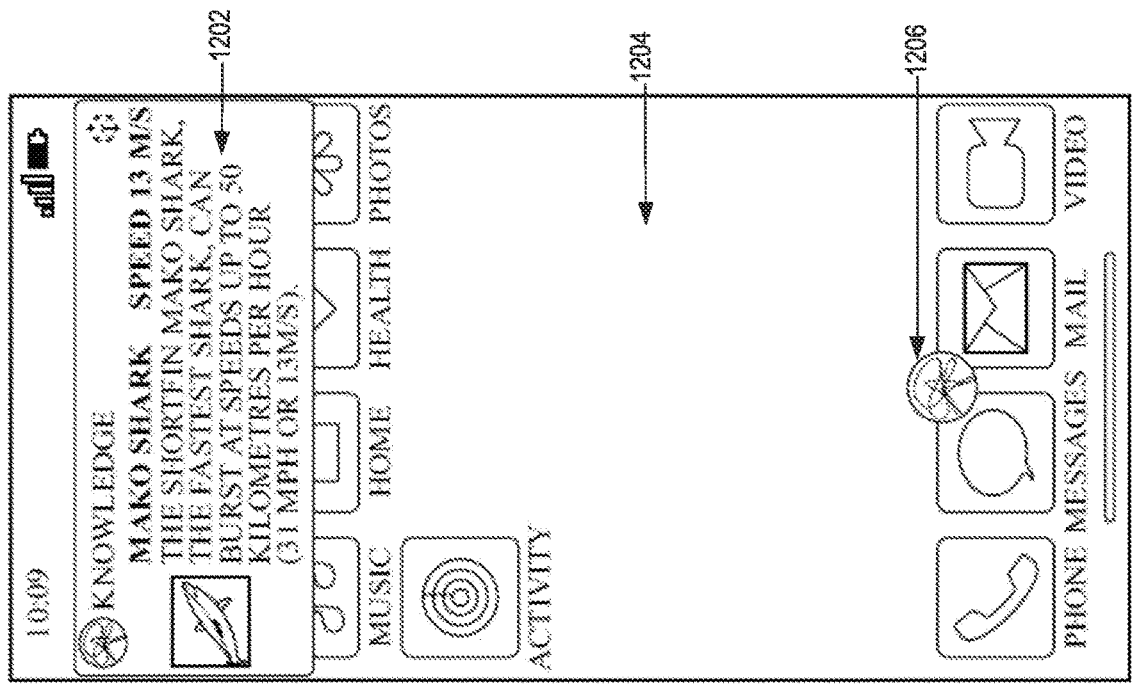
FIG. 12B
FIG. 12A

DIGITAL ASSISTANT FOR PROVIDING VISUALIZATION OF SNIPPET INFORMATION

CROSS-REFERENCE TO RELATED APPLICATIONS

This application claims the benefit of U.S. Provisional Patent Application No. 63/245,749, entitled "DIGITAL ASSISTANT FOR PROVIDING VISUALIZATION OF SNIPPET INFORMATION," filed Sep. 17, 2021, the contents of which is hereby incorporated by reference in its entirety for all purposes.

FIELD

This relates generally to intelligent digital assistants and, more specifically, to provide intelligent visualization of snippet information.

BACKGROUND

Intelligent automated assistants (or digital assistants) can provide a beneficial interface between human users and electronic devices. Such assistants can allow users to interact with devices or systems via natural language input in spoken and/or textual form. For instance, a user can issue a spoken request to a digital assistant operating on an electronic device (e.g., portable multifunctional devices such as a mobile phones, laptop computers, tablet computers, television set-top boxes, cable boxes, gaming devices, streaming media devices, digital video recorders, etc.). Based on the spoken request, the digital assistant can determine the user's intent and formulate a response to satisfy the user's intent.

SUMMARY

Systems and methods are disclosed for providing intelligent visualization of snippets on an electronic device. In an example method, a user request is received. In response to receiving the user request, the method determines a response for the user request, a format for a visual representation of the response, one or more virtual objects based on the format for the visual representation of the response, and a size for each of the one or more virtual objects based on the context information associated with the response. The method further enables display of the one or more virtual objects within a background environment based on the size for each of the one or more virtual objects and geometry of the background environment.

In another example method, a first user request is received. In response to receiving the first user request, one or more responses for the first user request are determined and presented to the user in a first environment on the electronic device. In the example method, a second user request from the user is received for showing a response from the one or more responses in a second environment. In response to the second user request, one or more virtual objects for displaying the response in the second environment are identified, a size for each of the one or more virtual objects is determined based on the context information associated with the response, and the one or more virtual objects are displayed within the second environment based on the size for each of the one or more virtual objects and geometry of the second environment.

Example non-transitory computer-readable media are disclosed herein. An example non-transitory computer-readable storage medium stores one or more programs. The one or more programs comprise instructions, which when executed by one or more processors of an electronic device, cause the electronic device to receive a user request. In response to receiving the user request, the electronic device determines a response for the user request, a format for a visual representation of the response, one or more virtual objects based on the format for the visual representation of the response, a size for each of the one or more virtual objects based on the context information associated with the response, and displays the one or more virtual objects within a background environment based on the size for each of the one or more virtual objects and geometry of the background environment.

Example non-transitory computer-readable media are disclosed herein. An example non-transitory computer-readable storage medium stores one or more programs. The one or more programs comprise instructions, which when executed by one or more processors of an electronic device, cause the electronic device to receive a first user request. In response to receiving the first user request, one or more responses for the first user request are determined and presented to the user in a first environment on the electronic device. The electronic device further receives a second user request from the user for showing a response from the one or more responses in a second environment. In response to the second user request, one or more virtual objects for displaying the response in the second environment are identified, a size for each of the one or more virtual objects is determined based on the context information associated with the response, and the one or more virtual objects are displayed within the second environment based on the size for each of the one or more virtual objects and geometry of the second environment.

Example electronic devices are disclosed herein. An example electronic device comprises one or more processors; a memory; and one or more programs, where the one or more programs are stored in the memory and configured are executed by the one or more processors, the one or more programs including instructions for receiving a user request. In response to receiving the user request, the one or more programs further includes instructions determines a response for the user request, a format for a visual representation of the response, one or more virtual objects based on the format for the visual representation of the response, a size for each of the one or more virtual objects based on the context information associated with the response, and displays the one or more virtual objects within a background environment based on the size for each of the one or more virtual objects and geometry of the background environment.

Example electronic devices are disclosed herein. An example electronic device comprises one or more processors; a memory; and one or more programs, where the one or more programs are stored in the memory and configured to be executed by the one or more processors, the one or more programs including instructions to receive a first user request. In response to receiving the first user request, one or more responses for the first user request are determined and presented to the user in a first environment on the electronic device. The one or more programs further includes instructions to receive a second user request from the user for showing a response from the one or more responses in a second environment. In response to the second user request, one or more virtual objects for displaying the response in the second environment are identified, a size for each of the one or more virtual objects is determined based on the context information associated with the response, and the one or more virtual objects are displayed within the second environment based on the size for each of the one or more virtual objects and geometry of the second environment.

An example electronic device comprises means for receiving a user request, determining a response for the user request, determining a format for a visual representation of the response, determining one or more virtual objects based on the format for the visual representation of the response, determining a size for each of the one or more virtual objects based on the context information associated with the response, and displaying the one or more virtual objects within a background environment based on the size for each of the one or more virtual objects and geometry of the background environment.

An example electronic device comprises means for receiving a first user request, determining one or more responses for the first user request, presenting the one or more responses to the user in a first environment of the electronic device, receiving a second user request from the user for showing a response from the one or more responses in a second environment, identifying one or more virtual objects for displaying the response in the second environment in response to the second request, determining a size for each of the one or more virtual objects based on the context information associated with the response, and displaying the one or more virtual objects within the second environment based on the size for each of the one or more virtual objects and geometry of the second environment.

In some examples, the above illustrated methods and techniques allow digital assistants to intelligently provide personalized visualizations of snippet information in response to a variety of user requests. Generally, in response to a user request or a query (e.g., "how tall is Lebron James?"), a user may be given a snippet or text content (e.g., "Lebron James is 6' 9" feet tall") that includes an answer to the user's query. However, in certain cases, the information within the snippet may not be enough for the user to understand or comprehend the answer to the user's request. For example, for a user query "how much is 1 quart," a typical snippet response of "1 quart is 32 ounces" may not help a user who is unfamiliar with ounces. Accordingly, it may trigger the user to ask additional questions such as "how much is 32 ounces" to the digital assistant. Providing visualization of the response along with the snippet can augment responses to the user's request or query without requiring additional questions or queries from the user.

Automatically augmenting the display of snippets with visualization without requiring further user input (e.g., after receiving the natural language input) makes the user-device interface more efficient (e.g., by reducing user inputs otherwise required to satisfy user requests and by helping users to understand information within the snippet), which additionally, reduces power usage and improves device battery life by enabling quicker and more efficient device usage. The above illustrated methods further enable graphical presentation or visualization of snippet information to the user right within the content which is being viewed or interacted by the user. The visualization of the snippet information is presented directly to the user in the user's preferred format in response to a natural language input request or query from the user.

BRIEF DESCRIPTION OF THE DRAWINGS

FIGS. 12A-12B illustrate an electronic device displaying snippet information and visualization of the snippet information in a compact mode, according to various examples.

DETAILED DESCRIPTION

Figure 1:
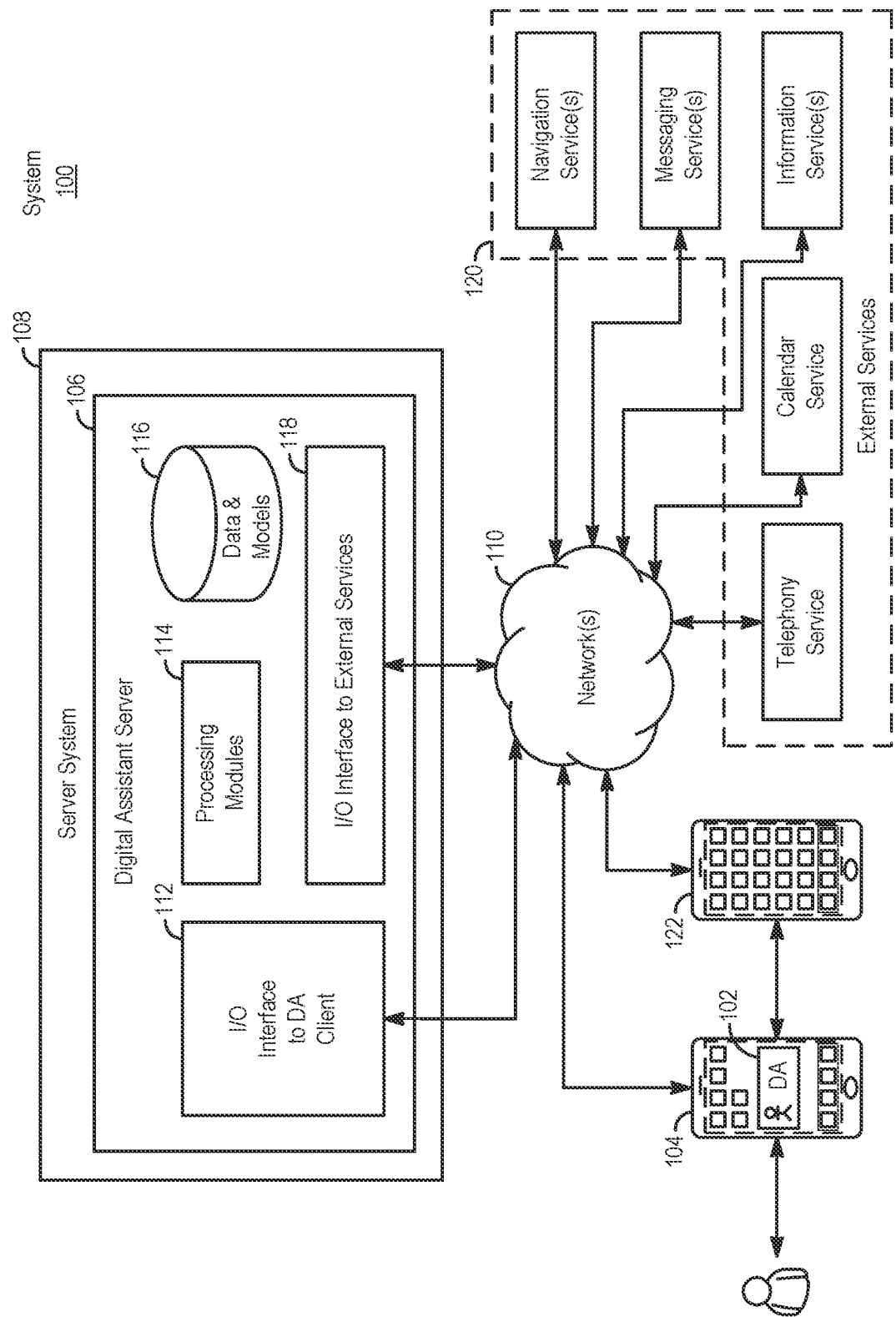
FIG. 1 is a block diagram illustrating a system and environment for implementing a digital assistant, according to various examples.

In the following description of examples, reference is made to the accompanying drawings in which are shown by way of illustration specific examples that can be practiced. It is to be understood that other examples can be used and structural changes can be made without departing from the scope of the various examples.

This disclosure relates to systems and processes for providing intelligent visualization or animation of snippet information by a digital assistant. Employing a digital assistant with an electronic device can assist users with providing information on the electronic device. The digital assistant associated with an electronic device may receive a user request querying about a person, an object, a location, quantity, general knowledge information, or any other type of information.

In response to user requests or queries, the digital assistant may consult one or more local or online sources (e.g., Wikipedia) to provide responses to user's queries as snippets (e.g., a short description with a title) on the electronic device. A snippet may best represent and describe a result to the user's query and explain how it relates to the user's query. The snippet may provide a condensed version of information in response to the user's request after consulting one or more sources. Often snippet information provided in response to user queries are not easy to comprehend for some users. Users may spend a considerable amount of time asking additional queries to the digital assistant to view the snippet information in an animated or visualized form or see comparative analysis of the information for better understanding of the information.

The digital assistant, as discussed herein, intelligently provides a visualized or animated response to a user's query in a user's preferred format. The digital assistant additionally shows visualized comparison between comparable contents to provide better representation of the information requested by the user. This can be desirable for improving user experience by decreasing the amount of time spent browsing for searching for better representation of information.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week."

In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIGS. 6A-B). A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, California Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
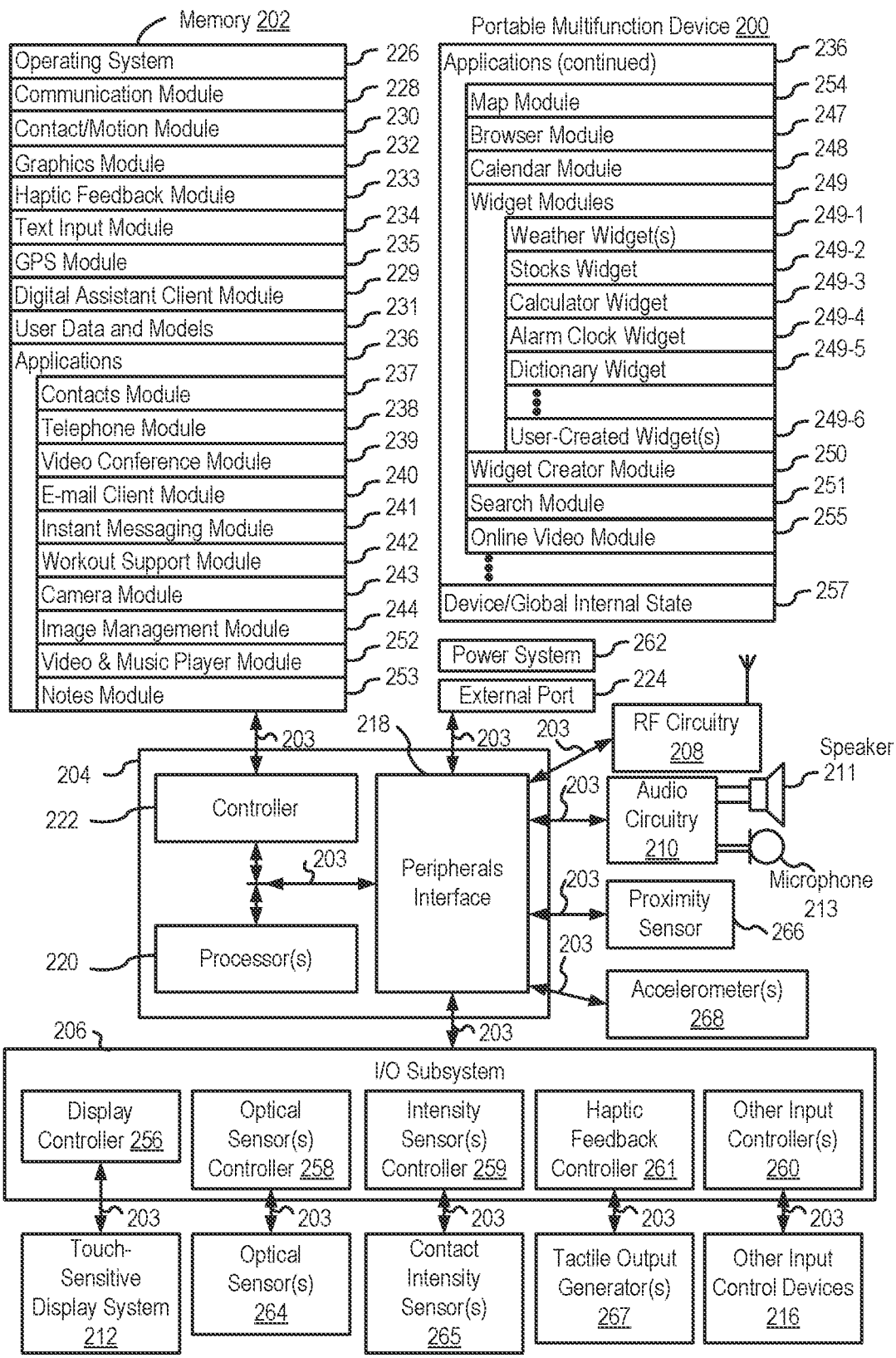
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown)

of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212.

In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device", Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
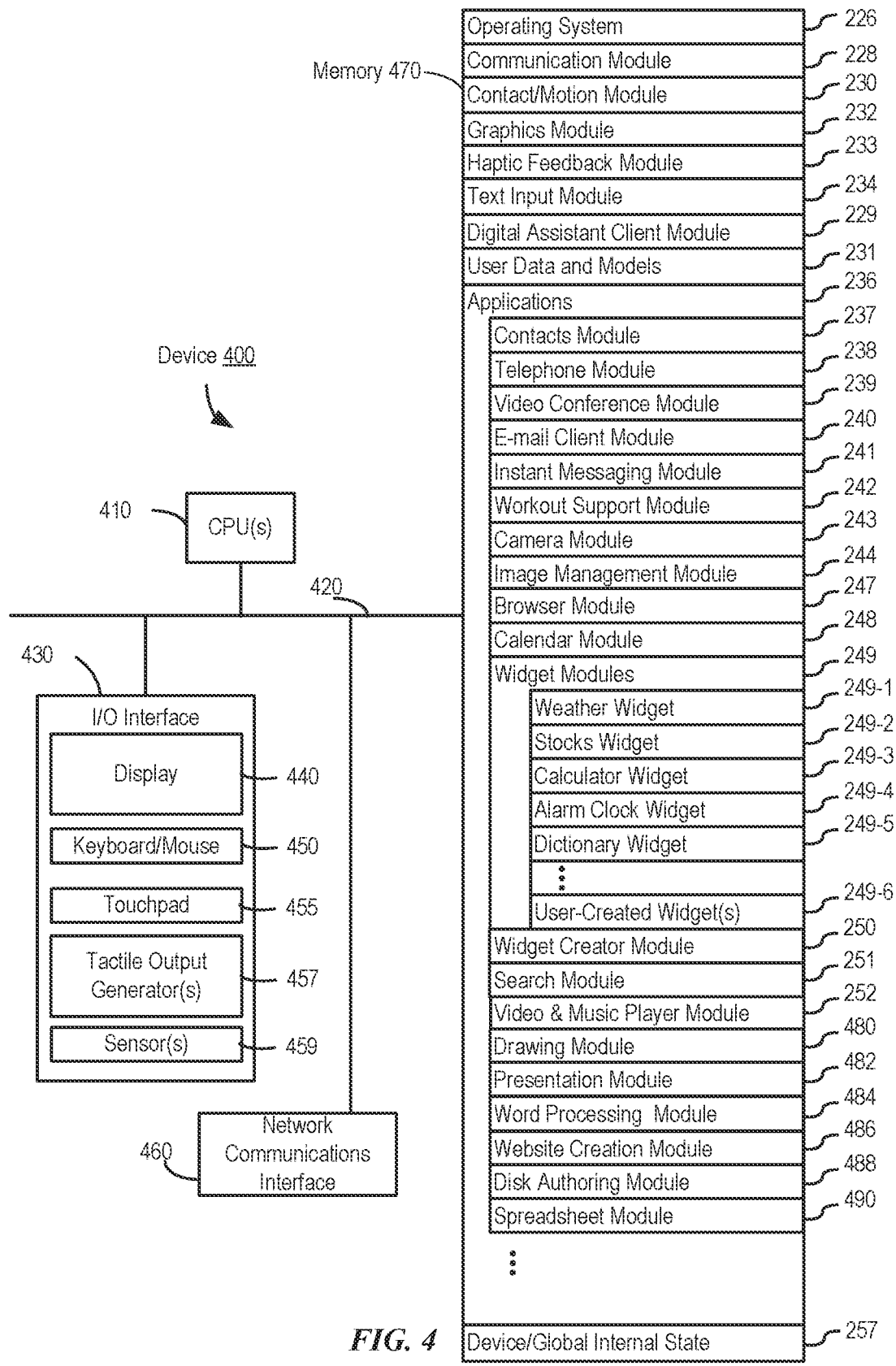
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone module 238 for use in location-based dialing; to camera module 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 include the following modules (or sets of instructions), or a subset or superset thereof:
- Contacts module 237 (sometimes called an address book or contact list);
- Telephone module 238.
- Video conference module 239;
- E-mail client module 240;
- Instant messaging (1M) module 241;
- Workout support module 242;
- Camera module 243 for still and/or video images;
- Image management module 244;
- Video player module;
- Music player module;
- Browser module 247;
- Calendar module 248;
- Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including; adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
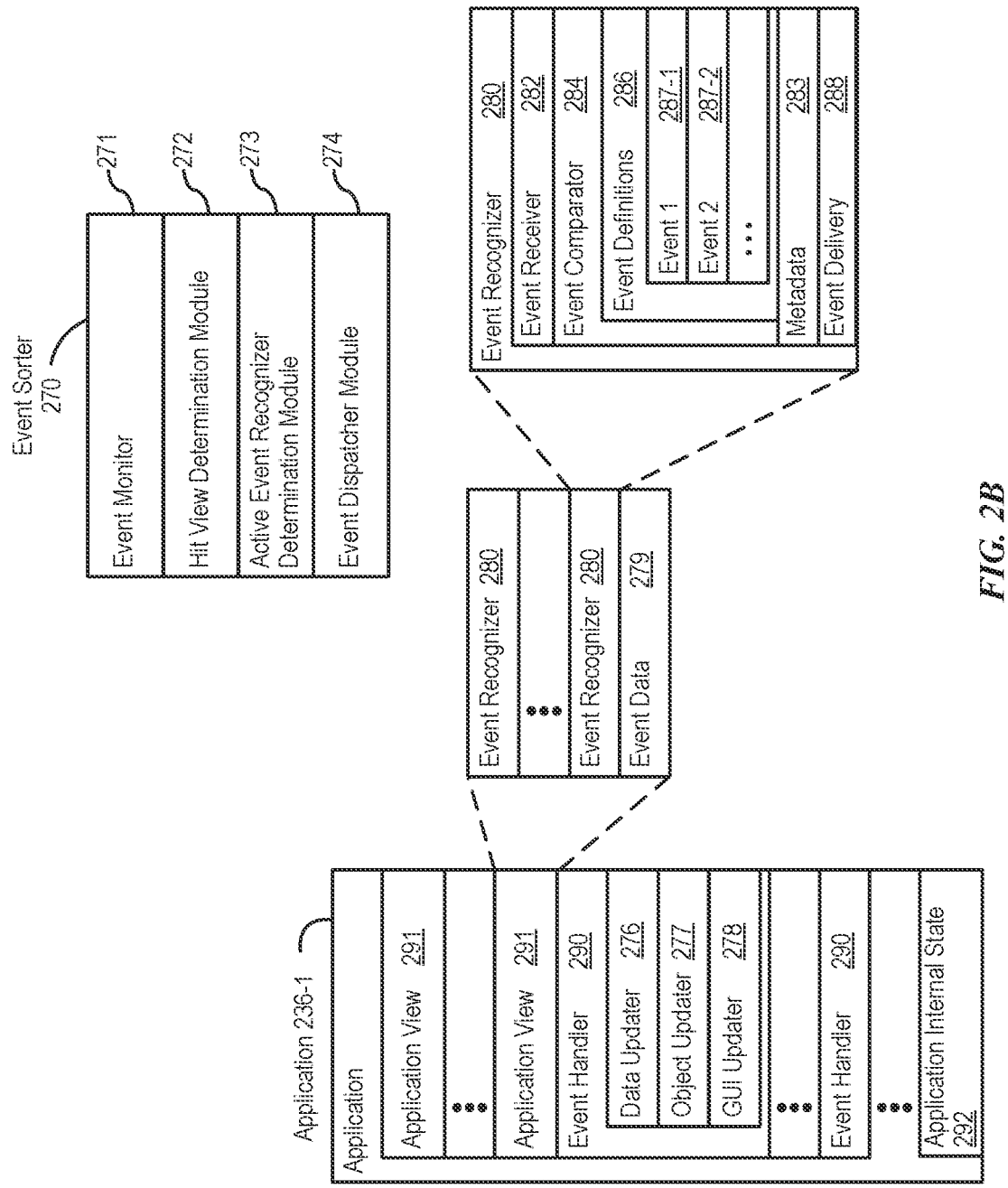
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
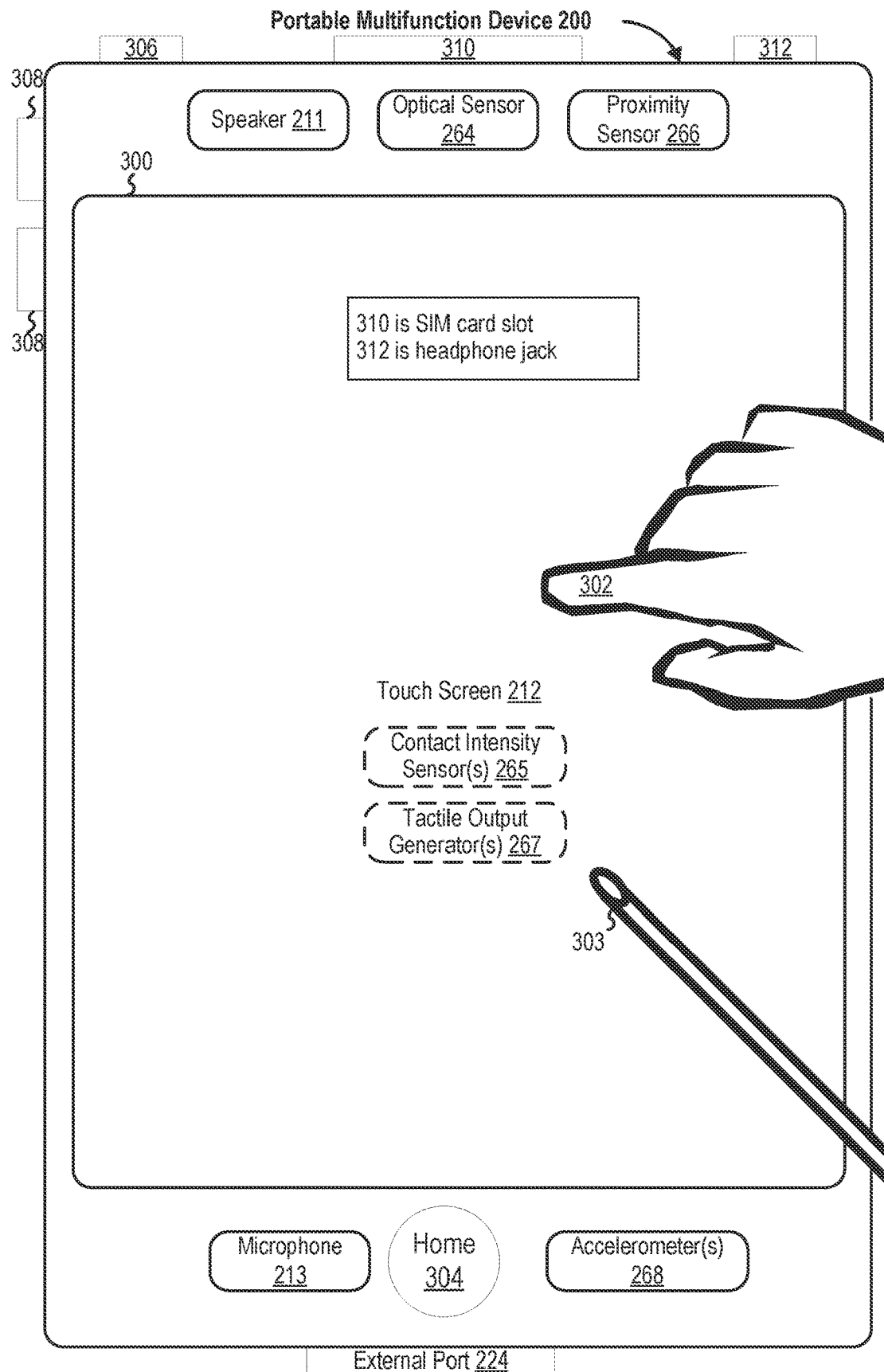
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
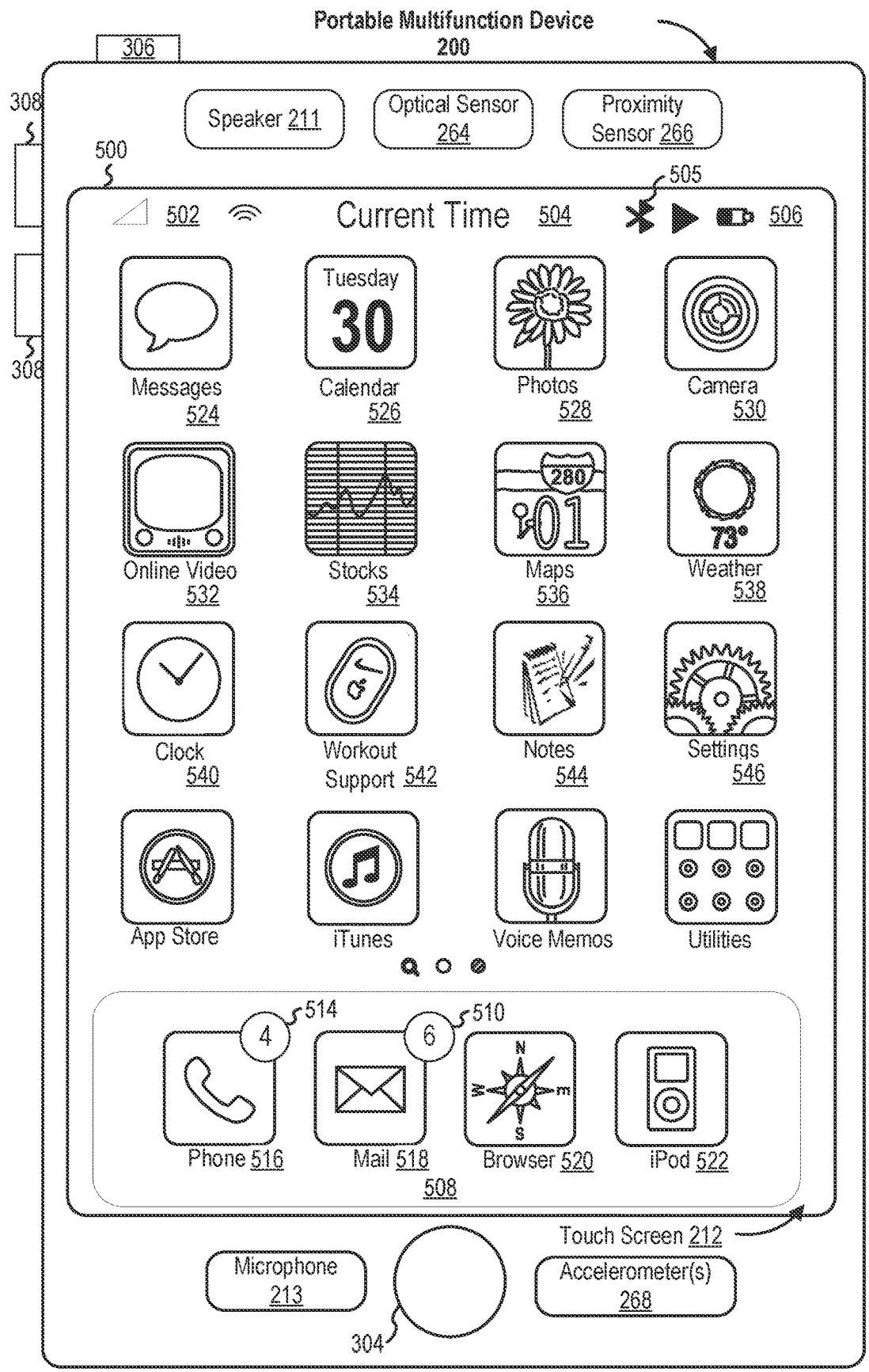
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
  Icon 516 for telephone module 238, labeled "Phone," which optionally includes an indicator 514 of the number of missed calls or voicemail messages;
  Icon 518 for e-mail client module 240, labeled "Mail," which optionally includes an indicator 510 of the number of unread e-mails;
  Icon 520 for browser module 247, labeled "Browser;" and
  Icon 522 for video and music player module 252, also referred to as iPod (trademark of Apple Inc.) module 252, labeled "iPod;" and
Icons for other applications, such as:
  Icon 524 for IM module 241, labeled "Messages;"
  Icon 526 for calendar module 248, labeled "Calendar;"
  Icon 528 for image management module 244, labeled "Photos;"
  Icon 530 for camera module 243, labeled "Camera;"
  Icon 532 for online video module 255, labeled "Online Video;"
  Icon 534 for stocks widget 249-2, labeled "Stocks;"
  Icon 536 for map module 254, labeled "Maps;"
  Icon 538 for weather widget 249-1, labeled "Weather;"
  Icon 540 for alarm clock widget 249-4, labeled "Clock;"
  Icon 542 for workout support module 242, labeled "Workout Support;"
  Icon 544 for notes module 253, labeled "Notes;" and
  Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
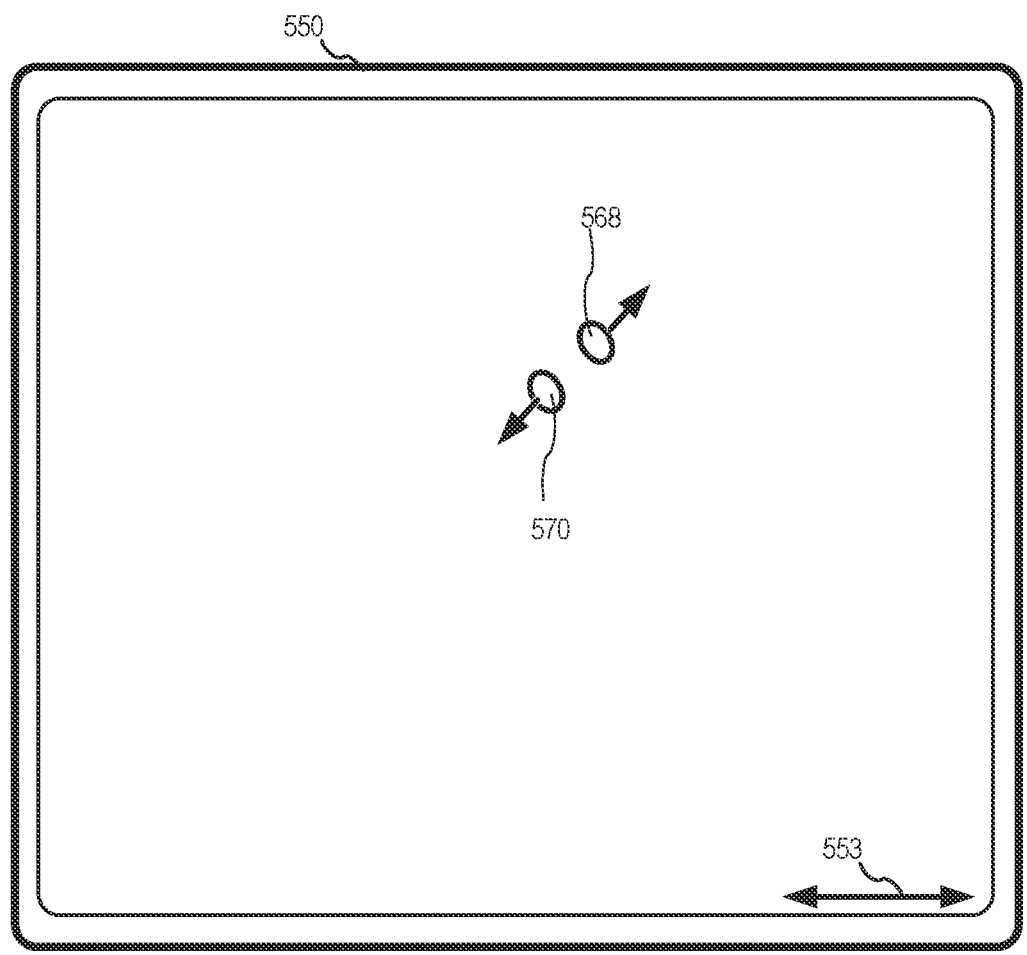
FIG. 5B illustrates an exemplary user interface for a multifunction device with a touch-sensitive surface that is separate from the display, according to various examples.
Figure 5B:
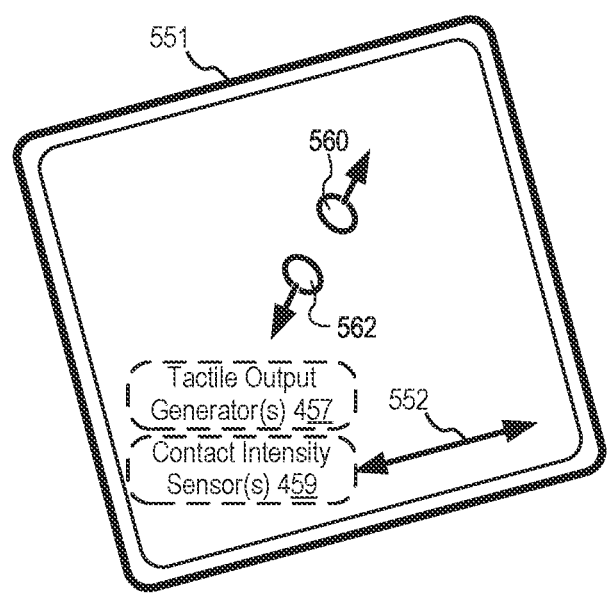

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 459) for detecting intensity of contacts on touch-sensitive surface 551 and/or one or more tactile output generators 457 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
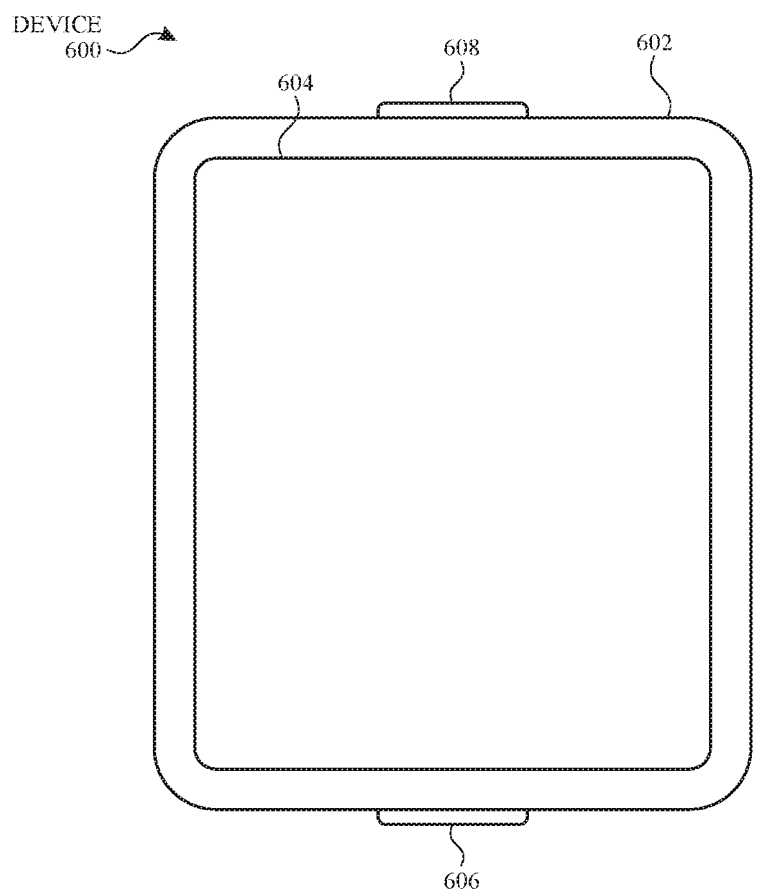
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
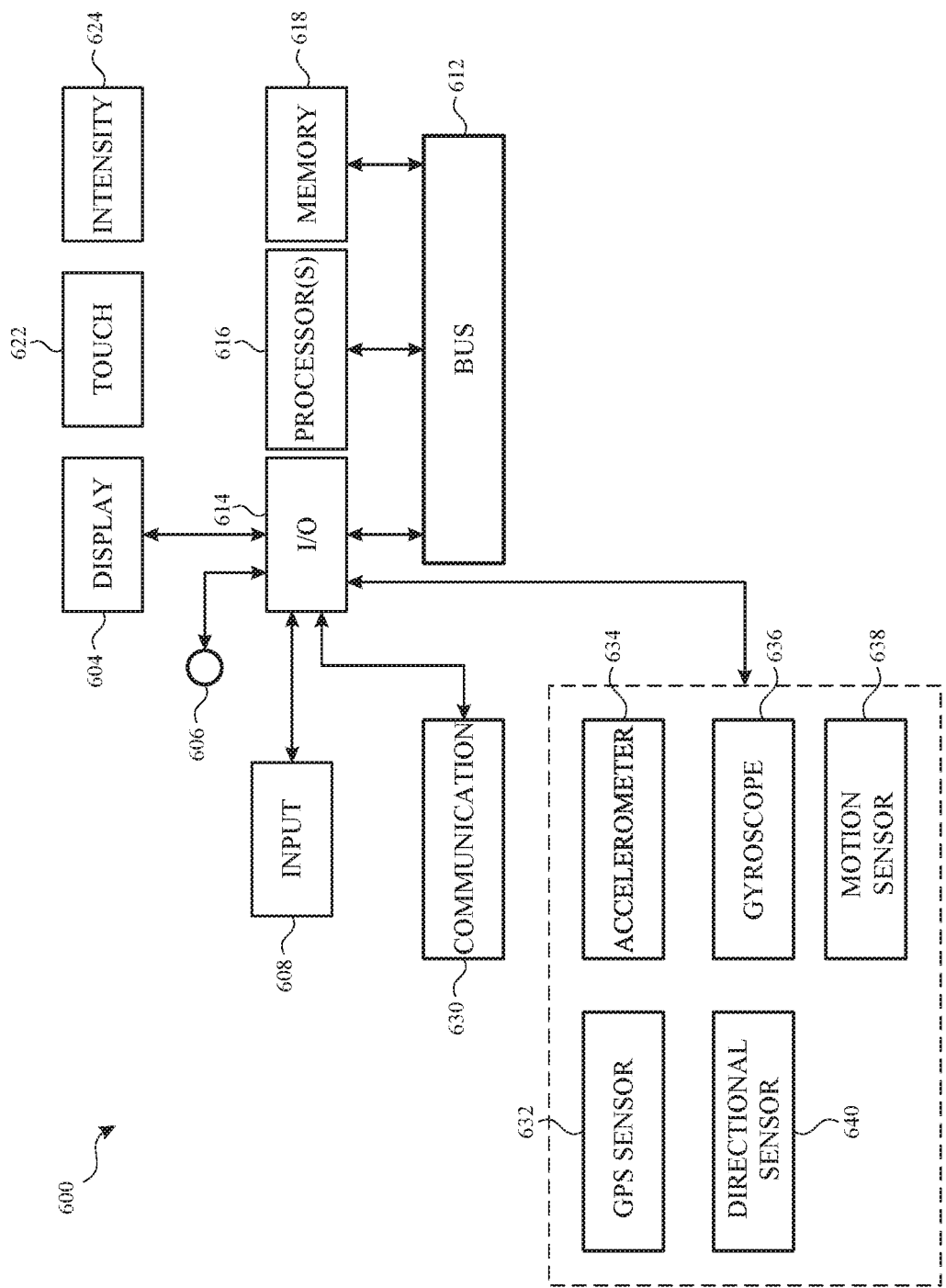
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples 110 section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2A, 4, and 6A-B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
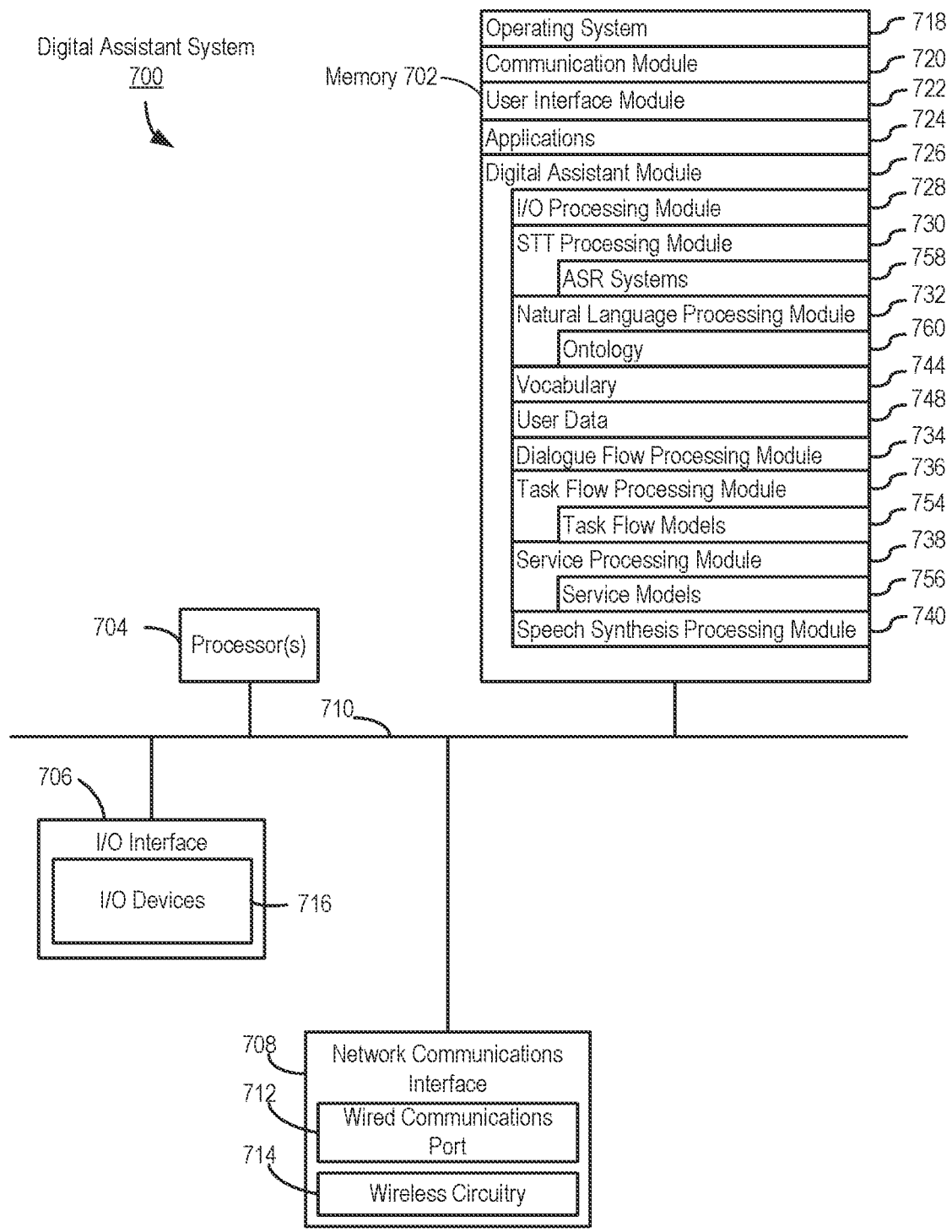
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
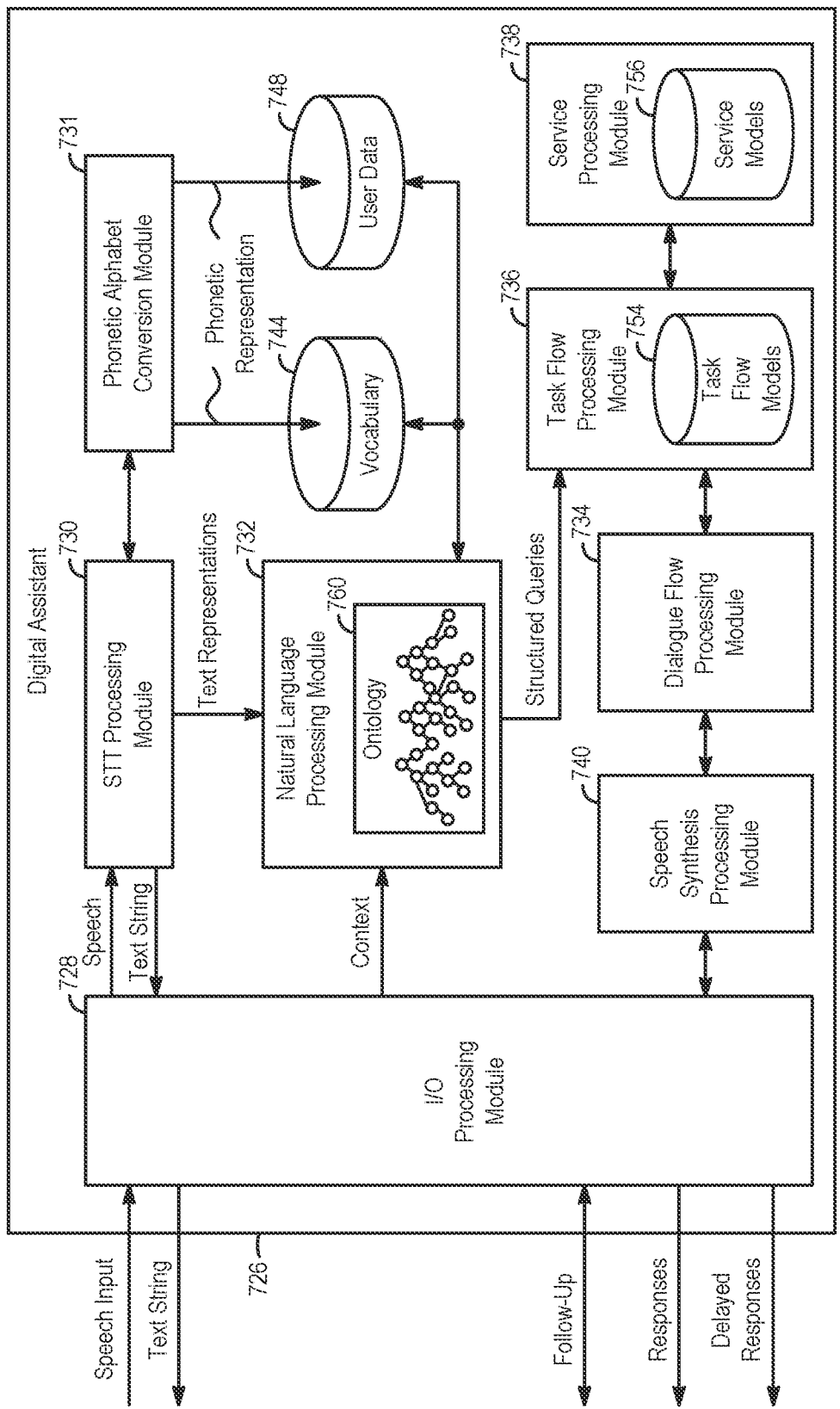
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪroʊ/ and /tə'mɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /tə'meɪroʊ/ is ranked higher than /tə'mɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /tə'meɪroʊ/ is associated with the United States, whereas the candidate pronunciation /tə'mɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) is ranked higher than the candidate pronunciation /tə'mɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /tə'meɪroʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /tə'meɪroʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
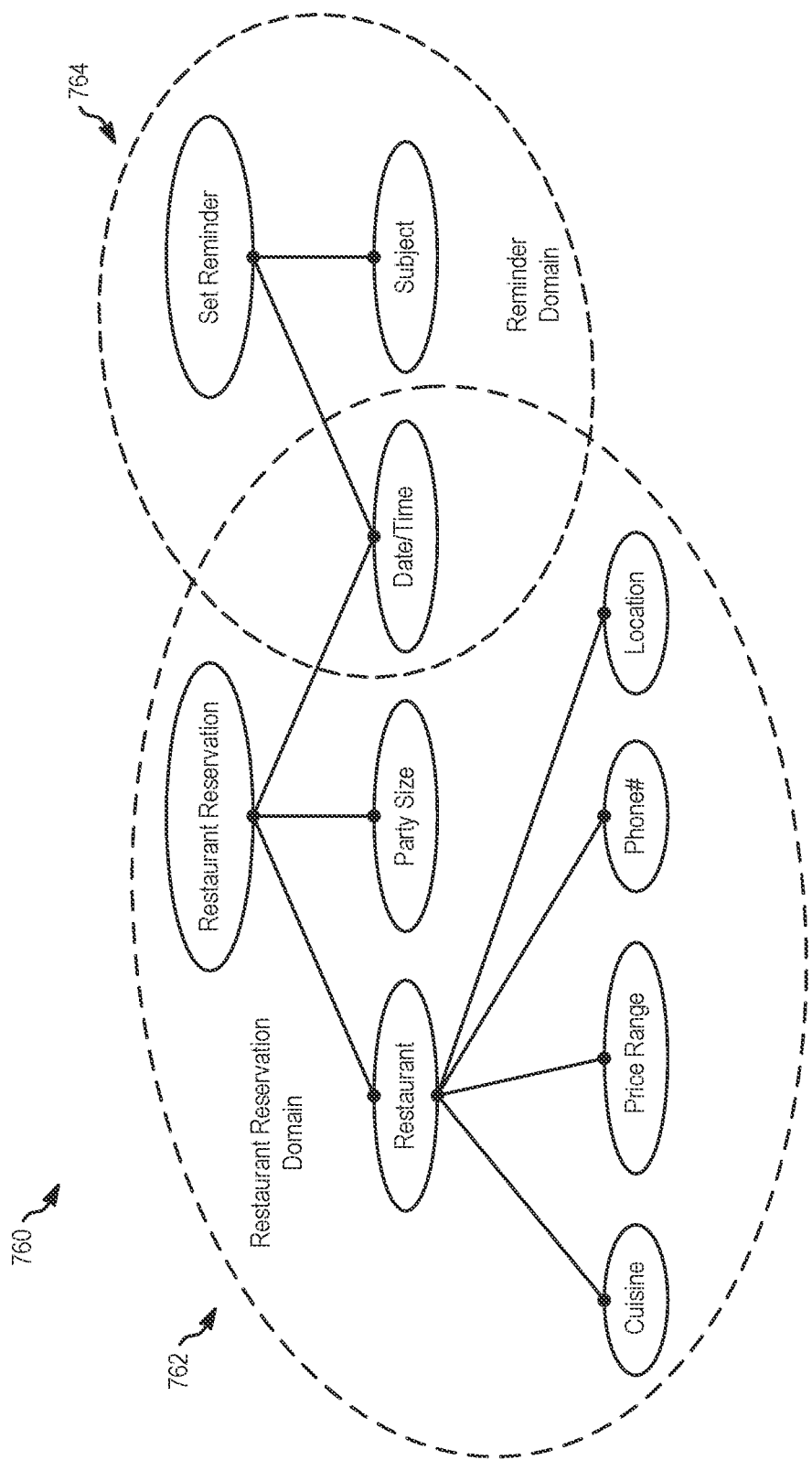
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as (Party Size) and (Date) are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. System and Technique for Visualization of Snippet Information

Figure 8A:
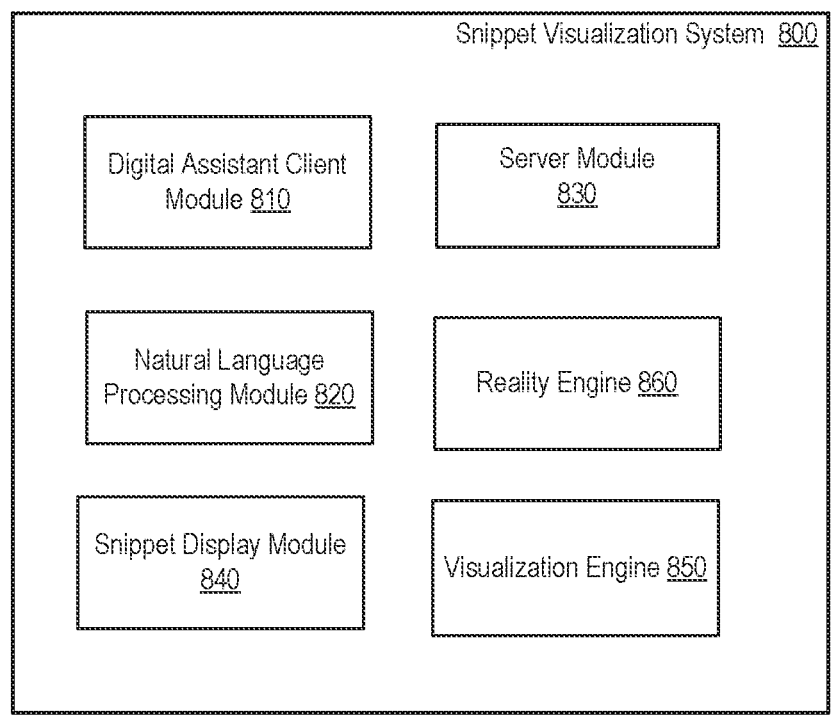
FIG. 8A illustrates a system and technique for providing intelligent visualization of snippet information, according to various examples.

FIG. 8A illustrates a system and technique for providing intelligent visualization of snippet information, according to various examples. The high level system diagram illustrates a snippet visualization system 800 for carrying out a process, for example, using one or more electronic devices implementing a digital assistant 700. In some examples, system 800 is implemented using a client-server system (e.g., system 100), and the modules of system 800 are divided up in any manner between the server (e.g., DA server 106) and a client device. In some examples, the modules of system 800 are divided up between the server and multiple client devices (e.g., a mobile phone and virtual reality headset). Thus, while portions of functions carried out by the system 800 are described herein as being performed by particular devices of a client-server system, it will be appreciated that system 800 is not so limited. In other examples, functions carried out by the modules within the system 800 are performed using only a client device (e.g., user device 104) without connecting to a server or network device or only multiple client devices. In the system 800, some modules are, optionally, combined, the order of some modules is, optionally, changed, and some modules are, optionally, omitted.

In accordance with some implementations, the snippet visualization system 800 may include a client module 810 which may include a display (e.g., 212), and which may provide an input interface and an output interface between the electronic device and a user. The input interface may be an icon of a digital assistant (e.g., 1002 in FIG. 10A) for a user to provide user requests. The display (e.g., 212) displays a visual output to the user. The visual output includes three-dimensional or two dimensional graphics, text, icons, video, and any combination thereof.

In some examples, the snippet visualization system 800 includes a natural language processing module 820 that directly interacts with the client module 810 (or user interface associated with the client module) of the electronic device, as shown in FIG. 8A. In some examples, the natural language processing module 820 may process a user's query or input to associate a user's query to one or more actionable intents recognized by the digital assistant. In some examples, the natural language processing module 820 may process a user's request and determine that the user's actionable intent is to retrieve a piece of information in response to the user's request. In some examples, the natural language processing module 820 may identify key terms (e.g., terms of interest) from the user's query or input.

In some examples, the snippet visualization system 800 includes a digital assistant server 830. The digital assistant server 830 may receive the processed user's request or query including a user's intent and key terms from the natural language processing module 820. The digital assistant server 830 may reside on the electronic device (e.g., 600) or on a remote device with more processing power and resources than the electronic device (e.g., a user device). In some examples, the user's client module 810 may provide additional information to the server 830 such as the user's preferred output format, type of user interface of the user device, and the like. In response to receiving the user's request, the server module 830 may provide an answer to be shown as a snippet in response to a user query.

In some examples, the server module 830 may search and consult multiple sources (e.g., Wikipedia, Google Search, etc.) to retrieve the answer to a user's query. The server module 830 may generate a snippet and title for the snippet to best represent and describe a result to the user's query, and explain how it relates to the user's query. In addition to obtaining a response (e.g., snippet) to a user's query, the server module 830 may provide metadata for visual representation of the information. For example, if a user's request includes a query about a basketball player's height, the snippet information from the server 830 may include the height information for the basketball player. In some examples, the server module 830 may provide snippet information and a link to additional data available on source consulted to obtain the snippet information.

In some examples, the metadata from the server module 830 may be supplemental information or information to override a default visualization rendered by the client module 810. For example, in response to query about a basketball player's height, the server module 830 may provide metadata that includes three-dimensional geometry and animation required to present visualization of the basketball player's height.

In addition, in some examples, the server module 830 may identify one or more templates relevant to provide graphical representation for the snippet information. In some examples, the server 830 may return a template that contains attribute information and resources to create three-dimensional images, audio, text, etc. for constructing visualization of snippet information. For example, for a user's request for basketball player's height information, the server 830 may provide one or more templates that include instructions for providing graphical representation of the height information to the user. In the above example, the one or more templates may include one or more virtual objects to present height scale and other information helpful for graphical presentation or animation for showing height information. Further, the metadata or information from the server 830 may override default information that the client module 810 may have to generate the visualization.

In some examples, the snippet visualization system 800 includes a snippet display module 840. The snippet display module 840 may display snippet information on a user interface or a display associated with the digital assistant (e.g., 600). In some examples, module 840 may analyze the metadata from the server 830 and present a portion of the metadata on a user interface associated with the digital assistant (e.g., 600). The snippet display module 840 may interact with the visualization engine 850 for providing visualization of snippet information along with the snippet information on the user interface.

In some examples, the visualization engine 850 may be responsible for generating instructions for providing visualization of the snippet information. In some examples, the visualization engine 850 may include a plurality of visualization modules and templates (further discussed in FIG. 8B description) for determining virtual objects, order and configuration of the virtual objects, and other information needed for providing visualization or animation of the snippet information. The visualization engine 850 may include a set of known visualization types for visualizing the snippet information. In some examples, visualization types are categories of visualizations that are programmed or designed as code modules and/or virtual objects to demonstrate animation or visualization of information. The categories of visualizations may be speed, volume, density, height, timeline, and the like. The types of visualizations may expand over time, may be combined to form new visualization types, or branched to create alternate versions.

Visualization types are effectively categories of visualizations that are programmed/designed as code modules to demonstrate a specific function including but not limited to speed, volume, density, height, timeline, etc. These types of visualizations will expand over time, some may be combined to form new visualization types or branched to create alternate versions.

In some examples, the visualization engine 850 may interact with a reality engine 860 in order to get information of the size of virtual objects and position of virtual objects on the user interface for providing visualization. The reality engine 860 may provide this information based on a location of the user in space and a direction of the user's gaze. In some examples, the reality engine 860 may manage a simulated reality (SR) setting for an electronic device. The simulated reality (SR) setting refers to an entirely or partly computer-created setting that individuals can sense and/or with which individuals can interact via an electronic system. In SR, a subset of an individual's movements and gaze are monitored, and, responsive thereto, one or more attributes in the SR setting is changed in a manner that conforms with one or more physical laws. For example, an SR system may detect an individual walking a few paces forward or gazing in a particular direction, and, responsive thereto, adjust graphics presented to the individual in a manner similar to how such scenery would change in a physical setting. In addition, real world physical objects (e.g., walls, furniture, chairs, people, etc.) by reality engine 860 may influence the positioning and scale of the visualizations.

In some examples, based on various sensor data (e.g., image, location, and orientation data) obtained from the sensors of the electronic device (e.g., 600), reality engine 860 renders the SR setting for display snippet visualization. Image sensors may include one or more first image sensors that are directed toward the user (e.g., for gaze tracking) and one or more second image sensors that are directed away from the user (e.g., for capturing image data of the physical setting). Reality engine 860 renders the SR setting, for example, based on gaze data derived from image data (e.g., image data of the user's eyes) received via one or more first image sensors of the electronic device (e.g., 600). Accordingly, the visualization engine 850 may scale or position each of the snippet visualizations based on the information (e.g., SR setting) from the reality engine 860.

In some examples, The visualization engine 850 may include different scales or measurement mechanisms to support a wide range of data. While presenting the visualization of the snippet information, the visualization engine 850 may consider presentation language, user's country's measurement standards (e.g., speed: mph vs kph), currency standards and exchange rate to present currency information, traffic standards based on user's location information, time standards (e.g., 12 hours versus 24 hour display), and cultural considerations.

Figure 8B:
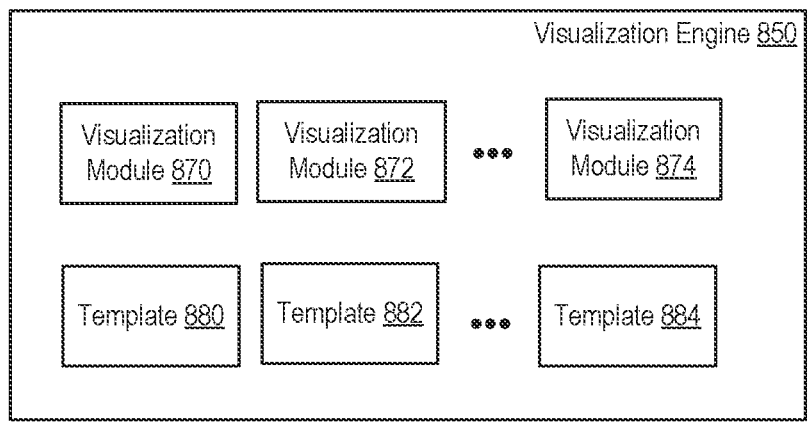
FIG. 8B illustrates a detailed description of the visualization engine, according to various examples.

FIG. 8B illustrates a detailed description of the visualization engine, according to various examples. The visualization engine 850 is responsible for receiving and handling metadata from the server module 830 for visualizing snippet information. In some examples, the visualization engine 850 may include visualization modules (e.g., 870, 872, and 874) that include information about various visualization types and virtual objects. In some examples, each visualization module may be associated with a visualization type or category of visualization (e.g., speed, volume, density, height, timeline, and the like). In some examples, multiple versions of a visualization module based on different categories such as locale, language, and the like may be used for handling the visualization of the snippet information. In addition, different versions of the visualization module may be used based on a time of the year or day (e.g., morning time, night time or holidays such as 4th of July).

The visualization engine 850 may be responsible for creating and managing the visualization modules (e.g., 870, 872, and 874). The visualization engine 850 may further include one or more templates (e.g., 880, 882, and 884) for setting up visualization properties for visualization modules for visualizing the snippet information. The one or more templates are used to help tailor or augment visualizations. The templates may provide information about how to present visualization of the snippet information without providing any information about the user's query. For example, template may providing information about presenting visualization in a specific color but does not provide information about the text to be presented.

In some examples, to enable a functionality of the visualization engine 850, the engine 850 is initialized. During initialization, the visualization engine 850 instantiates a collection of visualization modules (e.g., 870, 872, 874, etc.). Further, the visualization engine 850 parses all template files to facilitate mapping between one or more template identification of the template to key value pairs within the template. The visualization engine 850 may use parseTemplate (string filename) function to parse a specific template file into a map of key value pairs accessed by template identification. The mapping is used by the visualization modules (e.g., 870) for correctly forming visualization properties or settings.

In the above examples, the function ParseTemplate (string filename) parsing the template may take template file information (e.g., filename) including path to the template file containing key value pairs as an input parameter. In response, the function parsing the template may return template identification (e.g., templateID) that can be used to access key value pairs. In some examples, key value pairs may include properties such as types or names of components or virtual objects, material colors, textures, scale and size settings needed for visualization. For example, for visualizing the height of Lebron James, the template may include information such as a color for visualization, speed for visualization, and the like, as shown below.

{ textColor: #FFFFFF,
scaleSpeed: 10,
defaultShape: Line }

In some examples, the visualization engine 850 further determines which visualization module to use for a user request with a handleMetadata (string handleMetadata (string metadata)) function for providing visualization of snippet information. The function may process the metadata received from the server module 830. Specifically, the function may determine which visualization module to use for providing visualization of the snippet information for the metadata received from the server module 830. The function may analyze and disambiguate the metadata to remove any ambiguity prior to identifying a visualization module for the metadata. The function may further determine the template file to be used based on the metadata and forward key value data accessed by the template file identification (templateID) to the identified visualization module. In some examples, visualization metadata for visualization module are provided to the function handleMetadata in the form of a JSON key value pairs. The handleMetadata returns visualization type name. In some examples, the visualization type name may be associated with a collection of virtual objects to be used for generating visualization of the snippet information. In the above examples, the described function may override default information for generating visualization for snippet information.

In some examples, the visualization engine 850 further makes calls to the reality engine 860 to figure out position, orientation, and scale of the virtual objects to be used for the visualization of the snippet information. The visualization engine 850 may interact with a reality engine 860 in order to get information of how big and where to provide the visualization over the user interface. The reality engine 860 may provide this information based on a location of the user in space and a direction of the user's gaze. In alternative examples, visualization engine 850 may not include templates (e.g., 880, 882, and 884) and information to tailor or augment visualization are included as part of visualization modules.

Figure 9:
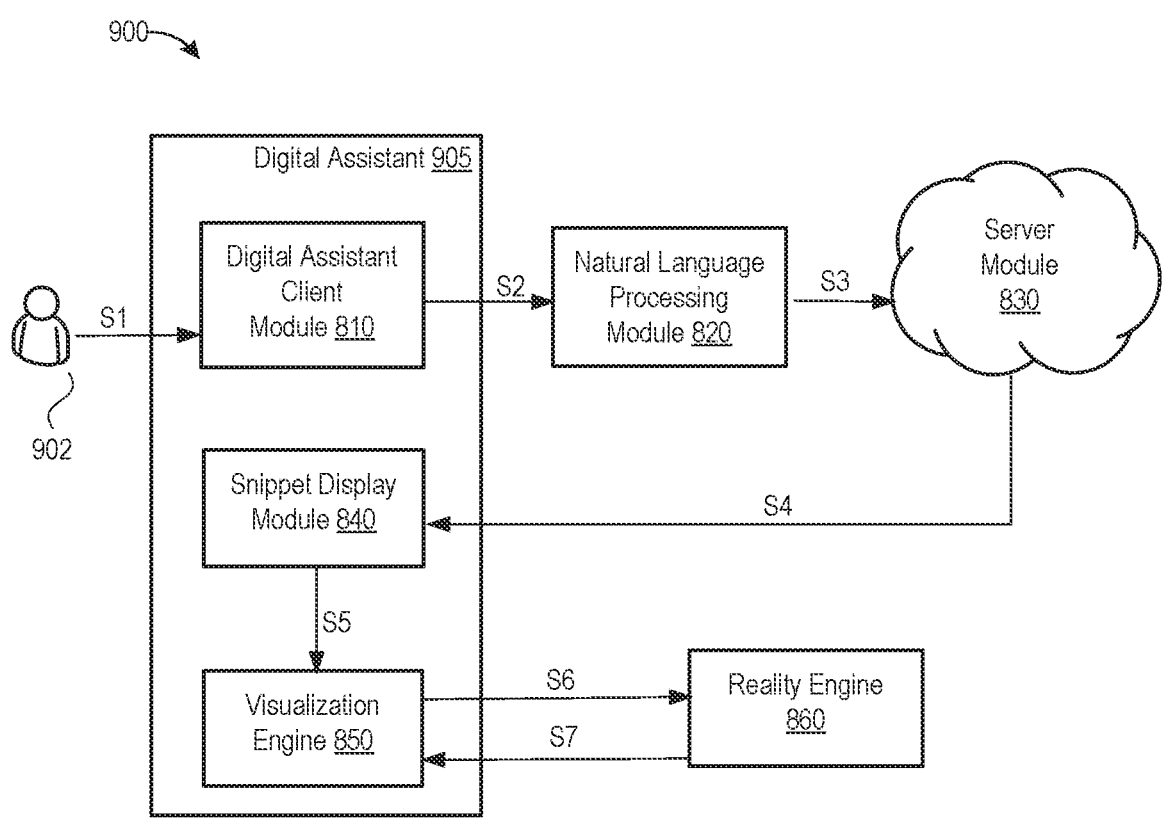
FIG. 9 is a block diagram illustrating a system for providing intelligent visualization of snippet information, according to various examples.

FIG. 9 is a block diagram illustrating a system for providing intelligent visualization of snippet information, according to various examples. In some examples, the following steps may be performed in order to provide a visualization or animation of snippet information in response to a user request on a user's electronic device.

In some examples, in step S1, a user 902 may provide a user request (e.g., a query) to a client module 810 of a digital assistant (e.g., 700). The user 902 may provide the user request after invoking the digital assistant by tapping on an icon (e.g., 1002) or providing key word speech (e.g., "Hey Siri") or by using other methods of invoking the digital assistant. In some examples, the user request may be a query or a question inquiring information about a person, object, or general knowledge item. For example, in an example, the user 902 may send a query to the client module 810. The query may be "Hey Siri, how tall is Lebron James?" or "what is Lebron James's height?" or a query requesting height information about Lebron James. In some examples, the user 902 may request to show comparison between different persons or animals or objects. For example, the user request may be "show height comparison between Lebron James and Michael Jordan."

In step S2, the digital assistant client module 810 may receive the search query from the user and forward the query to the natural language processing module 820. The natural language processing module 820 may identify one or more key terms (e.g., "Lebron James" and "height") within the search query. The natural language processing module 820 may further determine an actionable intent of the user based on the query.

Figure 15A:
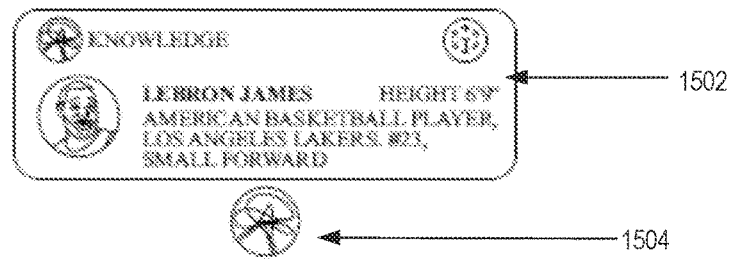
FIGS. 15A-15B illustrate an example of snippet information and visualization of snippet information involving size data in a room mode, according to various examples.

In step S3, the information about one or more key terms (e.g., "Lebron James" and "height") and user intent are forwarded to the server module 830. The module 830 may identify one or more local or online sources (e.g., Wikipedia website) involving one or more key terms of the search query. The server module 830 may generate a snippet based on the information available within the one or more sources. In the above example, the server module 830 may generate a snippet providing height information about Lebron James, and the snippet may be presented on the user interface or a display associated with the digital assistant (e.g., as shown in FIG. 15A).

In step S4, the server module 830 may forward the snippet to the snippet display module 840. The snippet display module 840 may display snippet information on a user interface or a display associated with the digital assistant (e.g., 600). The snippet display module 840 may interact with the visualization engine 850 for providing visualization of snippet information along with the snippet information on the user interface. In some examples, module 840 may analyze data related to snippet information from the server 830 and present a portion of the data on a user interface associated with the digital assistant (e.g., 600).

In some examples, at step S4, the server module 830 may also forward metadata for visualizing the snippet information to the display module 840. For example, in response to query about a basketball player's height, the server module 830 may provide metadata that includes three-dimensional geometry and animation required to present visualization of the basketball player's height. In some examples, the metadata from server module 830 may include the following information for presenting visualization of the height of a basketball player Lebron James.

```
{ type: "height",
method: compare,
value: <collection>{
    name: "Lebron James",
    modelURL: "https://example.com",
    height: 2.06 }}
```

In some examples, the metadata from the server module 830 may inform the visualization engine 850 about a specific module to use based on a type (e.g., speed, volume, density, height, timeline, etc.) of query from the user. The metadata provided by the server module 830 may refer to data in the visualization that needs to be visualized. In some examples, the server module 830 may further provide template for a visualization module (e.g., 870, 872, 874, etc.) that may change visualization (e.g., look and feel) presented by the visualization module.

In step S5, the snippet display module 840 may forward the metadata for visualization to the visualization engine 850. The visualization engine 850 may be responsible for generating instructions for providing visualization of the snippet information. In some examples, the visualization engine 850 may include a plurality of visualization modules and templates (further discussed in FIG. 8B description) for determining virtual objects, order and configuration of the virtual objects, and other information needed for providing visualization or animation of the snippet information. The visualization engine 850 may include a set of known visualization types and a disambiguation system to format user requests to a correct system and trigger a proper display logic for visualizing the snippet information.

Figure 10A:
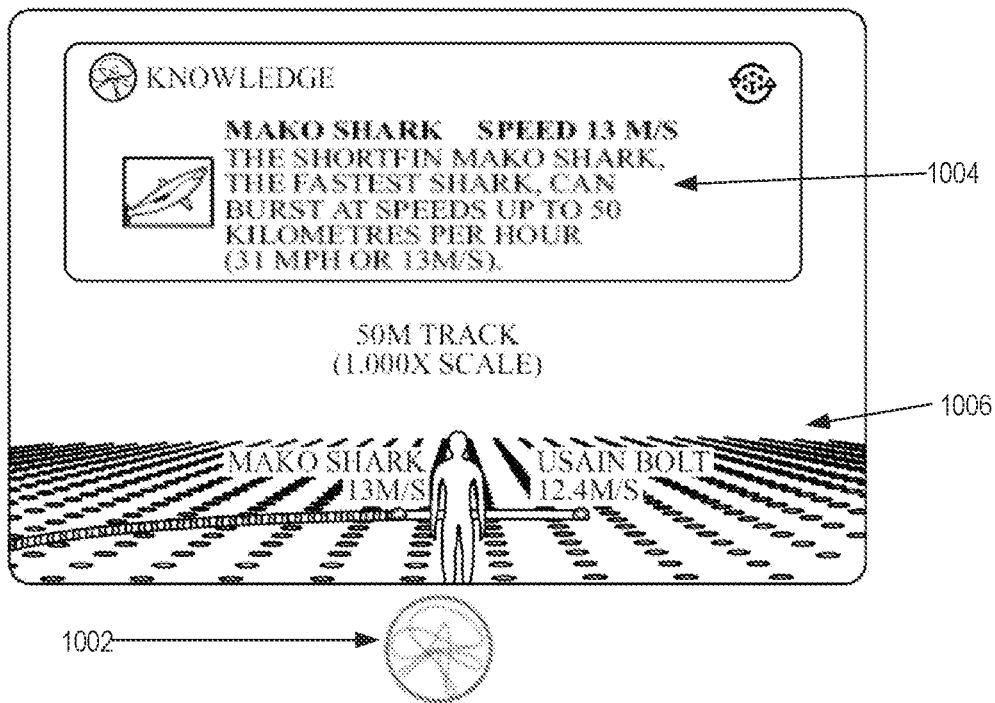
FIG. 10A illustrates an example visualization of snippet information including speed data, according to various examples.
Figure 15B:
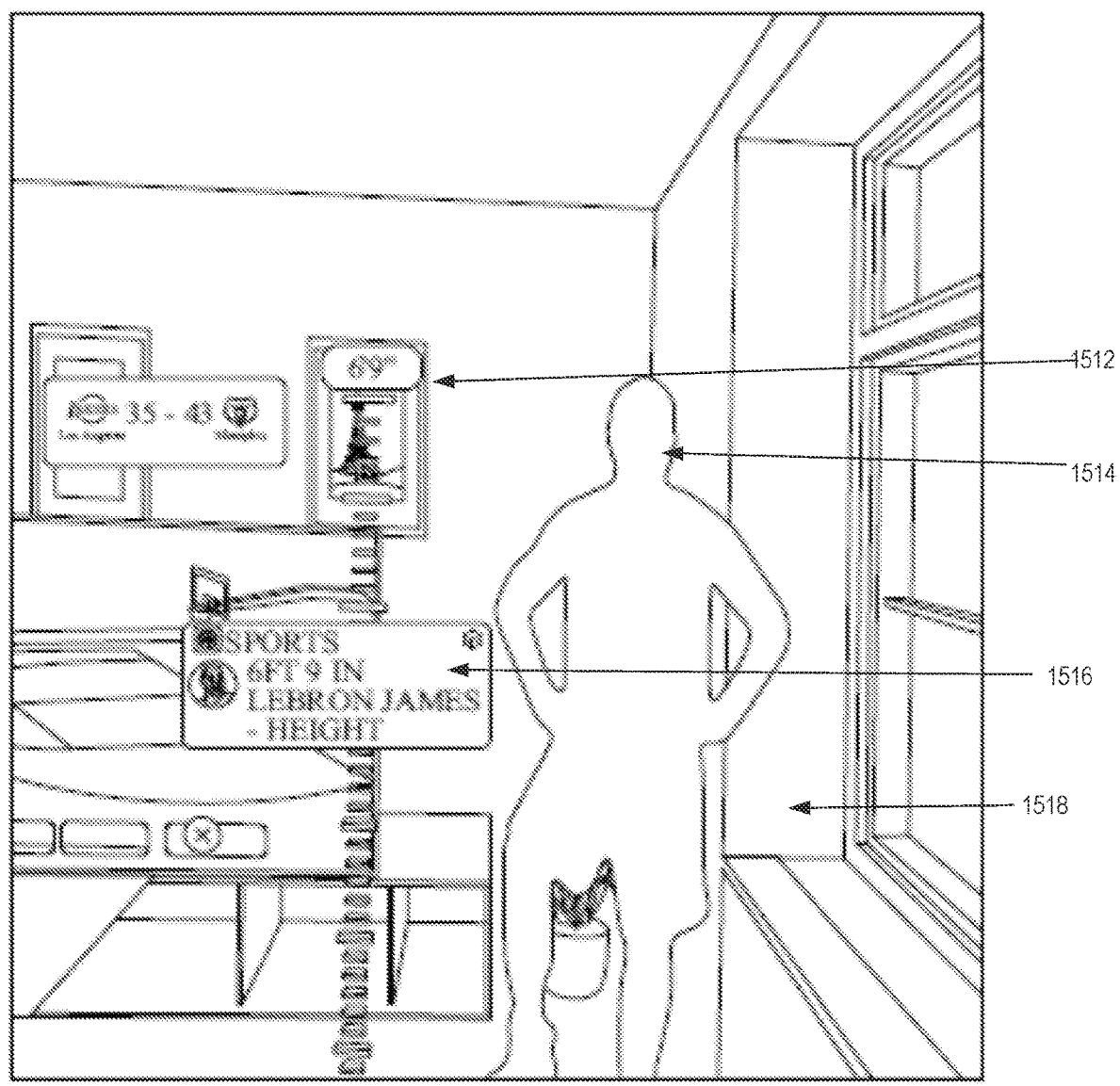

In some examples, visualization of snippet information may be provided using a format selected by a user or the format used by the user in historical interactions. The formats for visual representation of snippet information may be a compact mode, real-world environment mode (or room mode), or an immersive mode. The compact mode representation may include displaying the snippet information and virtual objects for visualization in a condensed form (e.g., virtual objects within predetermined size square or rectangular frame) on the electronic device (e.g., mobile phone, virtual reality headphone, etc.) as shown in FIG. 10A. The real-world environment or room mode representation may include displaying one or more virtual objects within a real-world background environment where the virtual objects are scaled to fit along with objects within the real-world background. For example, in the above example, virtual objects (e.g., scaled person, height scale, etc.) used for presenting the height of Lebron James may be shown within a room surrounding a user, as shown in FIG. 15B.

In some examples, an immersive mode representation may include displaying one or more virtual objects in its real scale within the display of an electronic device. In this mode, the virtual objects displayed based on the information available within the metadata from the server 830 without scaling up or down the objects to fit within the background environment. For example, in response to a user's question about the volume of a 55 gallon drum, the virtual object showing the volume may be shown in real scale, e.g., as shown in FIG. 11C.

In step S6, the visualization engine 850 may request information about simulated reality (SR) of a user and the surrounding environment of the user to the reality engine 860. Specifically, the visualization engine 850 may interact with a reality engine 860 in order to get information of how big and where to provide the visualization over the user interface. In step S7, the reality engine 860 may provide this information based on a location of the user in space and a direction of the user's gaze. In some examples, the reality engine 860 may manage a simulated reality (SR) setting for presenting snippet information to a user. For example, an SR system may detect an individual walking a few paces forward or gazing in a particular direction, and, responsive thereto, adjust graphics presented to the individual in a manner similar to how such scenery would change in a physical setting. Upon receiving information about simulated reality and surrounding environment of the user from the reality engine 860 in step S7, the visualization engine 850 may determine size and position of the virtual objects prior to presenting them on the display within the electronic device. In some examples, each of the virtual objects is a Graphical User Interface (GUI) component in a virtual three-dimensional space.

In addition to generating visualizations for snippets, the above illustrated methods and steps may allow applications, web browsers (e.g., Safari, Spotlight, etc.), or other type of systems to generate visualization of information. A combination of components, as shown in FIG. 9, may be embedded as a library in these applications or may be provided as an independent daemon application running on a client device, a network server providing the service, or any other type of device associated with hosting these applications.

FIG. 10A illustrates an example visualization of snippet information including speed data, according to various examples. In some examples, a user may provide a user request (e.g., a query) to a digital assistant (e.g., 700). In this example, the user request may be "Hey Siri, how fast is a Mako Shark?" or "what is a speed of a Mako shark?" or a query requesting speed information about Mako Shark after invoking the digital assistant (by tapping on an icon (e.g., 1002) or speech (e.g., "Hey Siri")). In some examples, the user may request to show speed comparison between different persons or animals or objects. For example, in this example, the user request may be "show speed comparison between Mako Shark and Usain bolt."

In the above example, the digital assistant (or the client module 810) may receive the search query from the user. The search query may be forwarded to the natural language processing module 820 for identifying one or more key terms (e.g., "Mako Shark" and "speed") within the search query and intent of the user. The information about one or more key terms (e.g., "Mako Shark" and "speed") and user intent are forwarded to the server module 830. The module 830 may identify one or more local or online sources (e.g., Wikipedia page) involving one or more key terms of the search query. The server module 830 may generate a snippet based on the information available within the one or more sources. In this example, the server module 830 may generate a snippet (e.g., 1004) providing speed information about the Mako Shark, and the snippet may be presented on the user interface or a display associated with the digital assistant.

In the above example, the snippet visualization system 800 may provide visualization of the snippet information (e.g., speed) in one of visual representation formats (e.g., compact mode, room mode, immersive mode, etc.) using steps S4-S7 (as suggested in FIG. 9). Specifically, the snippet visualization system 800 may identify virtual objects for visual representation (e.g., track with moving object to show speed) of snippet information, size of the virtual objects based on the format selected for the user, and display the virtual objects within a background environment based on the format selected for the user. In this example, virtual objects (e.g., a virtual person, 50 meter track, etc.) are displayed in immersive mode. The immersive mode representation may include displaying the snippet information in a computer-generated reality environment or in an animated form configured to present the virtual objects in a sequence or a specific order.

In the above example, as shown in FIG. 10A, in addition to displaying the snippet 1004, the visualization of the snippet (e.g., 1006) is displayed in an immersive mode on the electronic device (e.g. virtual reality headset) display. In this example, a 50 meter track is shown where an animation of a virtual object (e.g., person) moving with a specified speed information (e.g., 13 m/s) of Mako Shark is shown along with speed of a different object or person (e.g., Usain bolt) for comparison. The speed information may be shown in different forms upon a request from a user further discussed with reference to FIGS. 12A-12E.

Figure 10B:
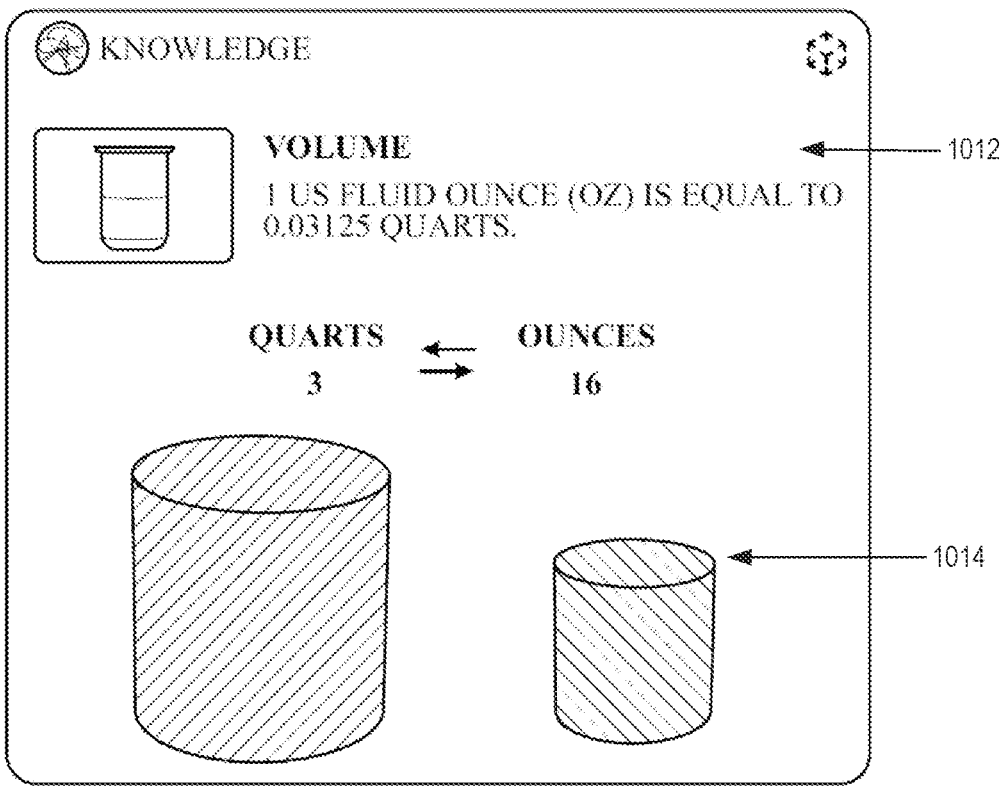
FIG. 10B illustrates an example visualization of snippet information involving volume data, according to various examples.

FIG. 10B illustrates an example visualization of snippet information involving volume data, according to various examples. In some examples, a user may provide a user request (e.g., a query) to a digital assistant (e.g., 700) may be "how much is 1 ounce?" or "convert 1 ounce to quarts" or a question requesting volume information about ounce or quarts by invoking the digital assistant. The search query (or relevant terms) may be forwarded to the server module 830 where the server module 830 generates a snippet based on the information available within one or more sources (e.g., Wikipedia). In this example, the server module 830 may generate a snippet (e.g., 1004) providing volume information about quarts and ounces where the information may be presented on the user interface or a display associated with the digital assistant, as shown in FIG. 10B.

In the above example, the snippet visualization system 800 may provide visualization of the snippet information (e.g., volume) in one of a plurality of visual representation formats (compact mode, room mode, immersive mode, etc.) using steps S4-S7 (as suggested in FIG. 9). Specifically, the snippet visualization system 800 may identify virtual objects for visual representation (e.g., volume) of snippet information, size of the virtual objects based on the format selected for the user and contextual information associated with the snippet, and display the virtual objects within a background environment based on the format selected for the user. In this example, virtual objects (e.g., cylindrical container, etc.) are displayed in a compact format. The compact mode representation may include displaying the snippet information and virtual objects for visualization of the snippet information in a condensed form on the electronic device (e.g., mobile phone, virtual reality headphone, etc.). An example of providing visual representation of snippet information involving volume is further described with reference to FIG. 13A.

Figure 10C:
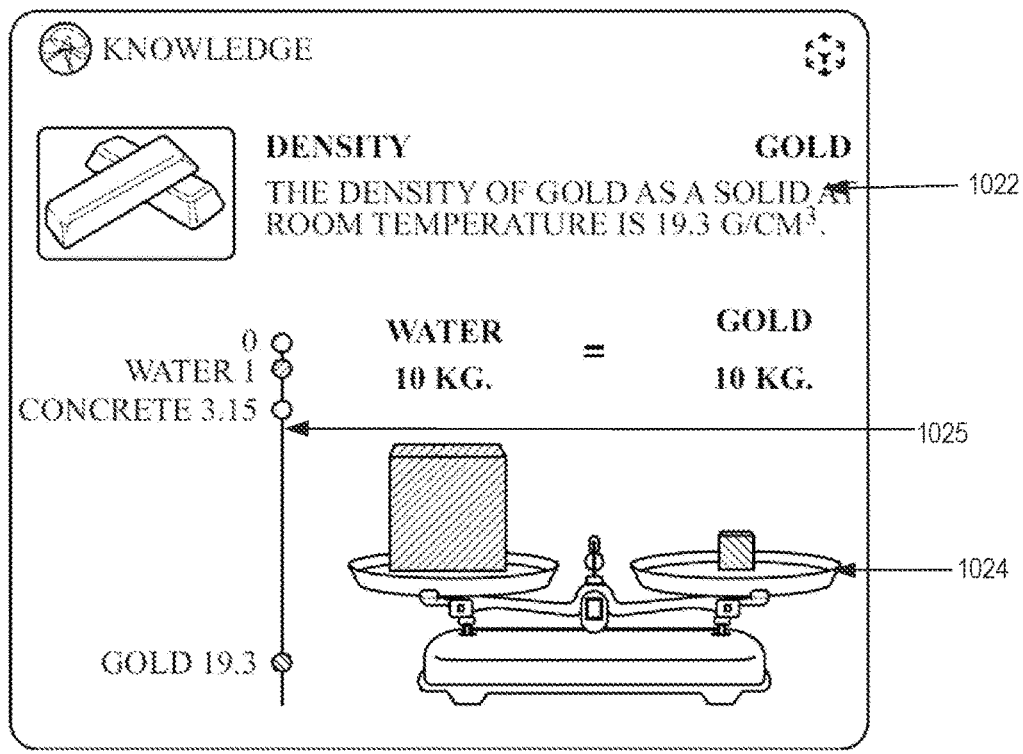
FIG. 10C illustrates an example visualization of snippet information involving density data, according to various examples.

FIG. 10C illustrates an example visualization of snippet information involving density data, according to various examples. In some examples, a user's request (e.g., a query) to a client module 810 associated with a digital assistant (e.g., 700) may be "what is a density of gold?" or "compare density of gold with water" or a question requesting density information about gold by invoking the digital assistant. The search query (or relevant terms) may be processed and forwarded to the server module 830 where the server module 830 generates a snippet based on the gold's density related information available within one or more sources (e.g., Wikipedia). In this example, the server module 830 may generate a snippet (e.g., 1004) providing density information about gold and water, and the information may be presented on the user interface or a display associated with the digital assistant, as shown in FIG. 10C.

In addition, the snippet visualization system 800 may provide visualization of the snippet information (e.g., gold density) in one of a plurality of visual representation formats (compact mode, room mode, immersive mode, etc.) using steps S4-S7 (as suggested in FIG. 9). Specifically, the snippet visualization system 800 may identify virtual objects for visual representation of gold's density information, size of the virtual objects based on the format selected for the user, and display the virtual objects within a background environment based on the format selected for the user. In this example, virtual objects such as balance scale 1024, density of gold and water shown in cube format, comparison of density on a line scale 1025 are displayed in a compact format. The compact mode representation may include displaying the snippet information and virtual objects for visualization of the snippet information in a condensed form on the electronic device (e.g., mobile phone, virtual reality headphone, etc.).

In the above example, after the user's initial query of "what is a density of gold?," the user may further provide a second request or query such as "what about concrete?" to further inquire about the density of concrete. In response, the visualization of snippets for gold density is updated to include concrete density comparison, as shown in 1025 of FIG. 10C.

Figure 10D:
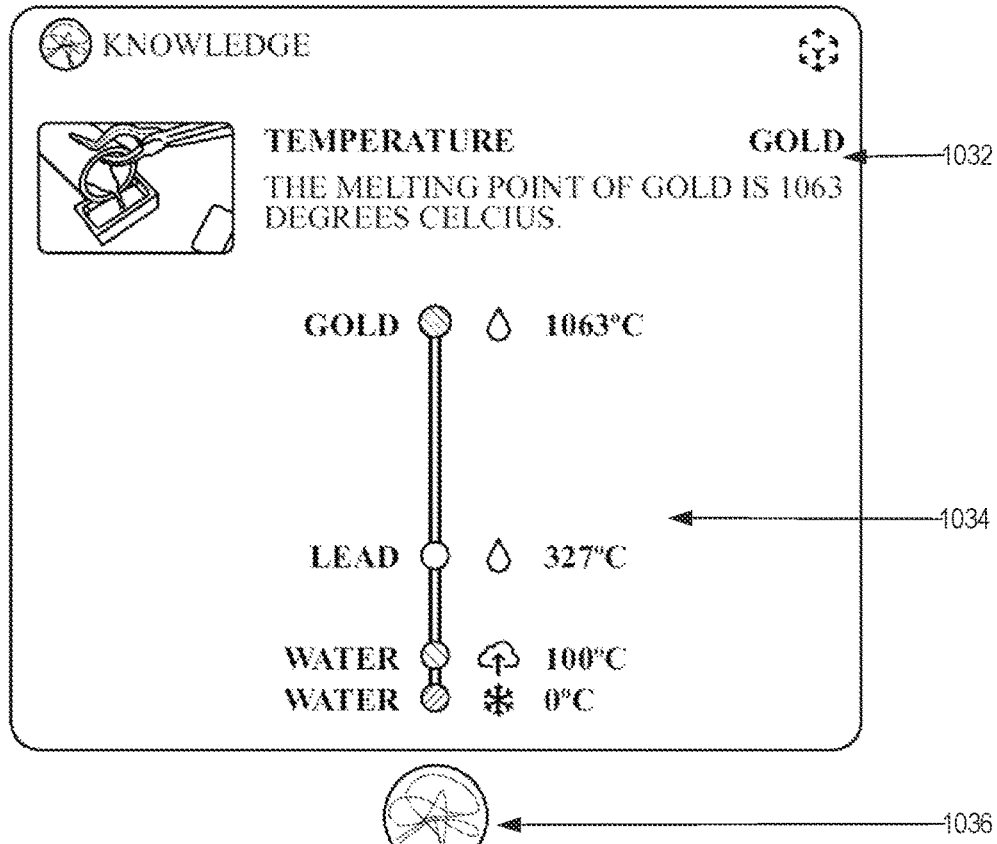
FIG. 10D illustrates an example visualization of snippet information involving temperature data, according to various examples.

FIG. 10D illustrates an example visualization of snippet information involving temperature data, according to various examples. In some examples, a user's request (e.g., a query) to a client module 810 associated with a digital assistant (e.g., 700) may be "Hey Siri, what is the melting point of gold?" or a question requesting information about gold's melting point by invoking the digital assistant 1036. The search query (or relevant terms) may be forwarded to the server module 830 where the server module 830 generates a snippet based on the gold's melting point information available within one or more sources (e.g., Wikipedia). In this example, the server module 830 may generate a snippet (e.g., 1032) providing a melting point for gold, and the information may be presented on the user interface or a display associated with the digital assistant, as shown in FIG. 10D.

In addition, the snippet visualization system 800 may provide visualization of the snippet information (e.g., gold melting point) in one of visual representation formats (compact mode, room mode, immersive mode, etc.) using steps S4-S7 (as suggested in FIG. 9). Specifically, the snippet visualization system 800 may identify virtual objects for visual representation of gold's melting point information, size of the virtual objects based on the format selected for the user, and display the virtual objects based on the format selected for the user. In this example, virtual objects such as temperature scale 1034 may be used to show the melting point of gold and comparison of melting points of gold and water in a compact mode.

In the above example, after the user's initial query of "what is a melting point of gold?" the user may further provide a second request or query such as "what about lead?" to further inquire about the melting point of lead. In response, the visualization of the snippet for gold density (e.g., temperature scale 1034) is updated to include melting point of lead for comparison, as shown in 1034 of FIG. 10D.

Figure 10E:
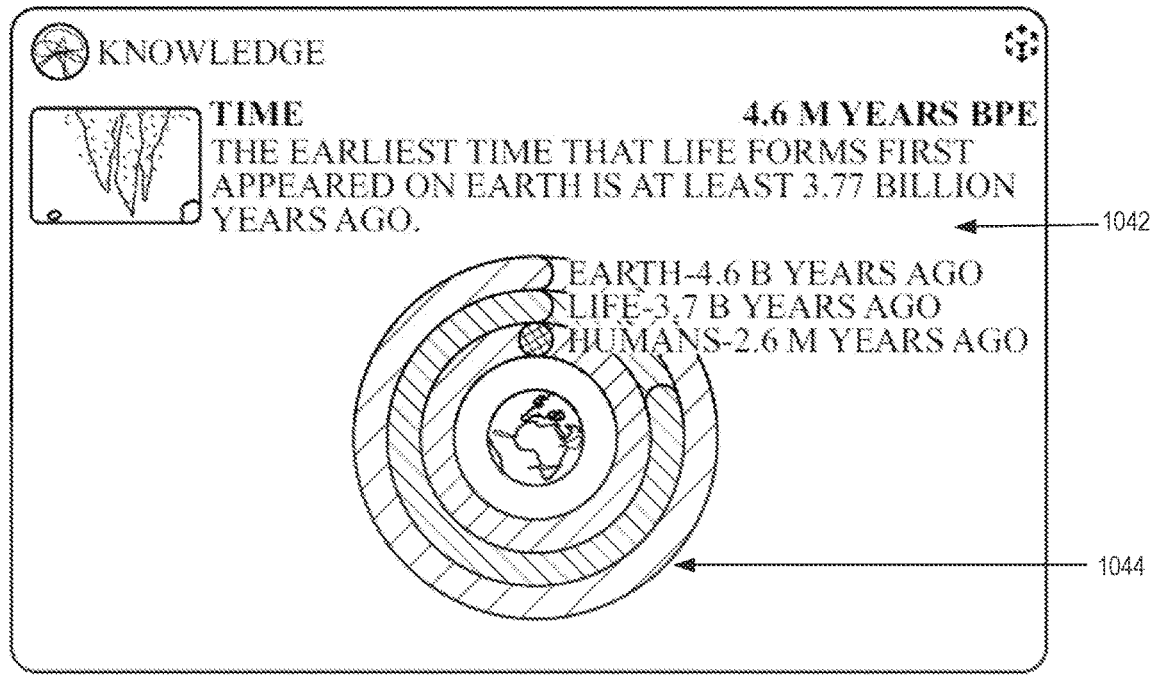
FIG. 10E illustrates an example visualization of snippet information involving time data, according to various examples.

FIG. 10E illustrates an example visualization of snippet information involving time data, according to various examples. In some examples, a user's request (e.g., a query) to a client module 810 associated with a digital assistant (e.g., 700) may be "Hey Siri, when did life begin on the earth?" or a question requesting information about a timeline of life form by invoking the digital assistant 1046. The search query may be processed and forwarded to the server module 830 where the server module 830 generates a snippet based on the timeline of the earliest form of life information available within one or more local or online sources. In this example, the server module 830 may generate a snippet (1042) providing information about timeline for earliest life, and the information may be presented on the user interface or a display associated with the digital assistant, as shown in FIG. 10E.

In the above example, the snippet visualization system 800 may provide visualization of the earliest form of life in one of a plurality of visual representation formats (compact mode, room mode, immersive mode, etc.) using steps S4-S7 (as suggested in FIG. 9). Specifically, the snippet visualization system 800 may identify virtual objects (time scale 1044) for visual representation of the timeline of earliest life and display the virtual objects based on the format selected for the user. In this example, virtual objects such as time scale 1044 may be used to show the timeline of the earliest form of life and it's comparison with the timeline of existence of the earth in a compact mode. In the above example, after the user's initial query of "when did life begin on the earth," the user may further provide a second request or query such as "when did humans begin on earth?". In response, the visualization of snippet information for timeline (e.g., time scale 1044) is updated to include a timeline for human life as a comparison with timeline of the earliest form of life, as shown in 1044 of FIG. 10E.

Figure 10F:
FIG. 10F illustrates an example visualization of snippet information involving date and time data, according to various examples.

FIG. 10F illustrates an example visualization of snippet information involving date and time data, according to various examples. In some examples, a user's request (e.g., a query) to a client module 810 associated with a digital assistant (e.g., 700) may be a question requesting information about a list of historical events by invoking the digital assistant 1046. The server module 830 may generate a snippet based on the requested information about historical events from one or more sources (e.g., Wikipedia). The snippet visualization system 800 may provide visualization of a list of historical events in one of a plurality of visual representation formats (compact mode, room mode, immersive mode, etc.) using steps S4-S7 (as suggested in FIG. 9). Specifically, the snippet visualization system 800 may identify virtual objects (timeline graph 1048) for visual representation of the timeline of historical events and display the virtual objects based on the format selected for the user. In this example, virtual objects such as a timeline graph 1048 may be used to show the list of events based on their occurrence in a compact mode. In some examples, photographs, video snippets, or three-dimensional animations of historical events may be shown next to the timeline 1050 instead of textual description of historical events (as shown in 1048). For example, in response to a user's query about space race of the United States, the visualization of snippet information involving the US space events may be shown with photographs and/or video snippets of a rocket, an astronaut, a space shuttle and the like next to the timeline of the events. In some embodiments, textual description of the historical events is shown in addition to the photographs, video snippets, or three-dimensional animations of historical events over the timeline 1050.

Figure 10G:
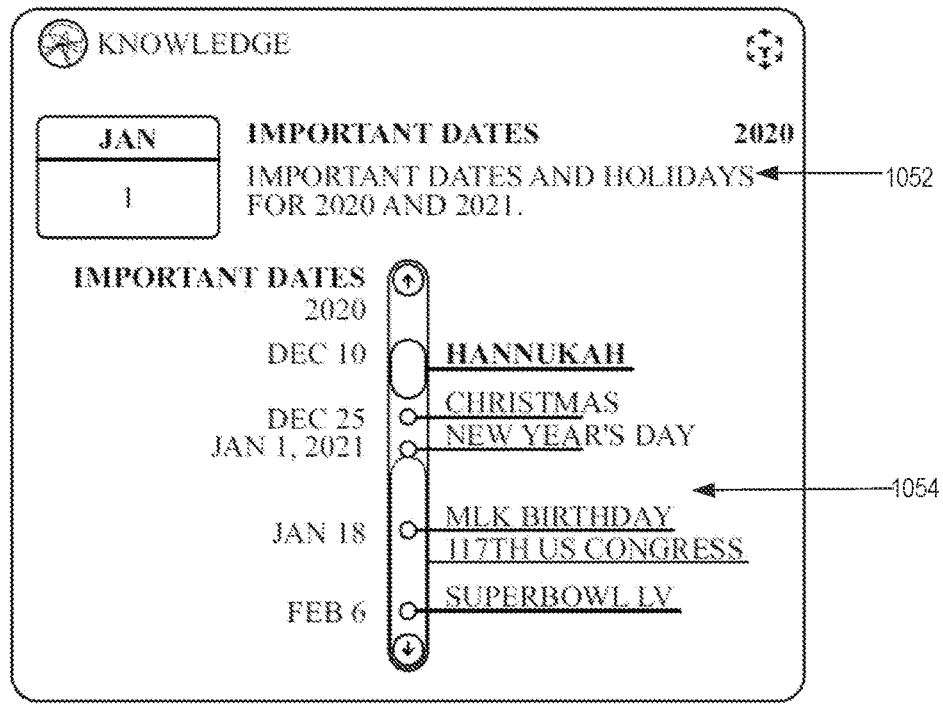
FIGS. 10G-I illustrate an example visualization of snippet information involving multiple dates, according to various examples.
Figure 10H:
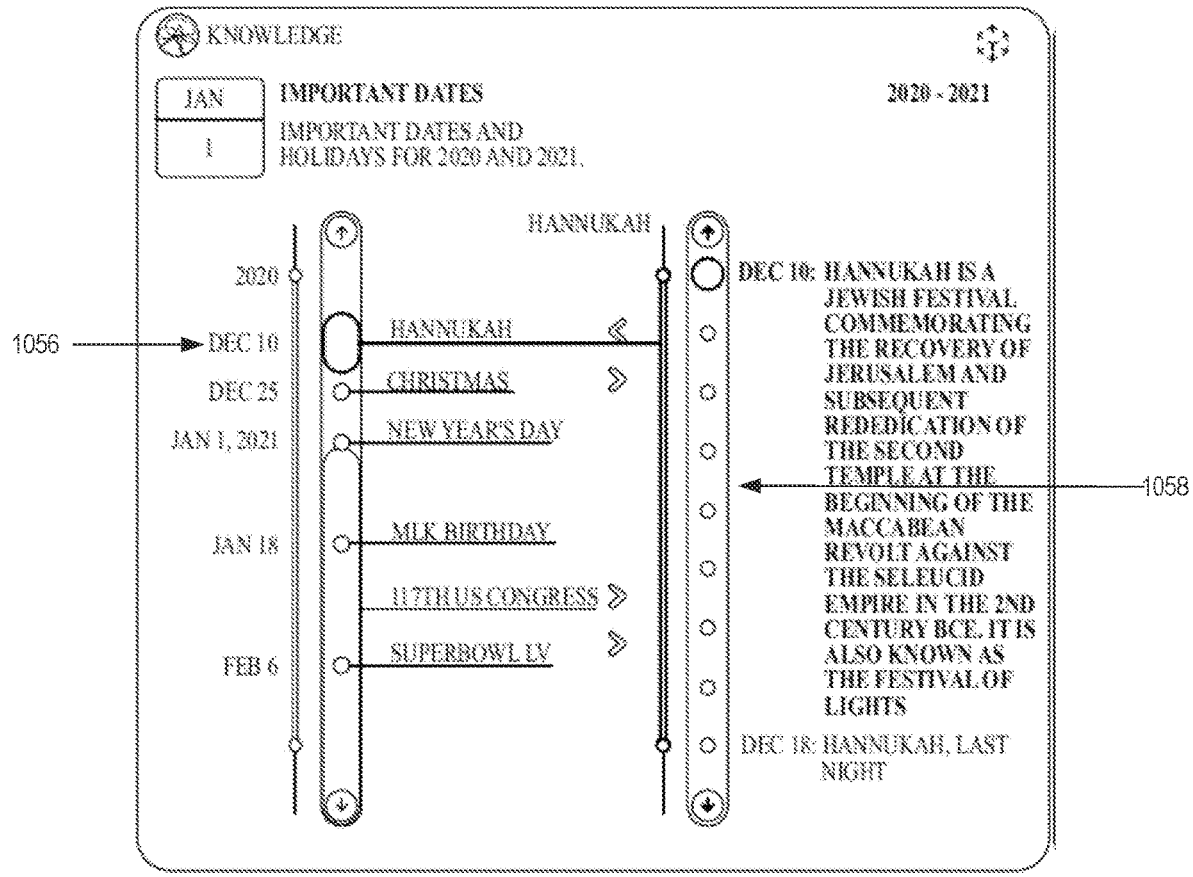
Figure 10I:
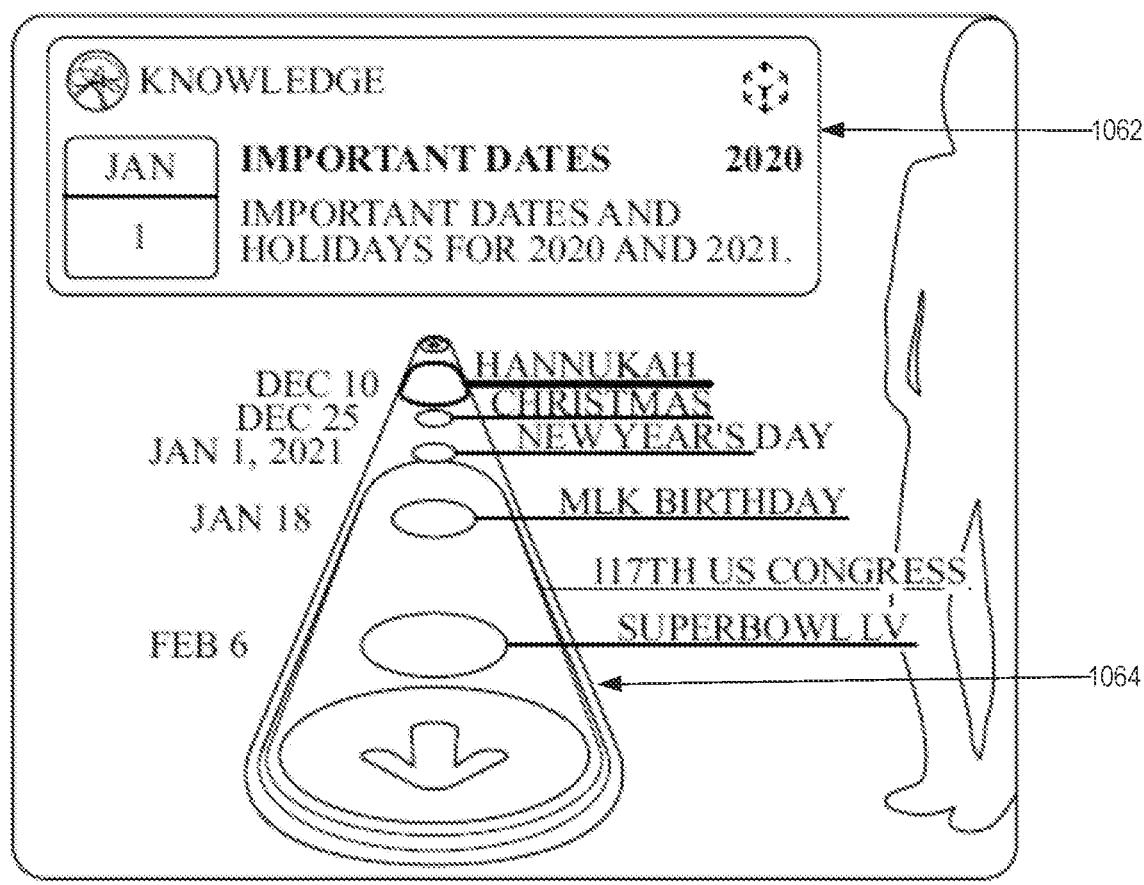

FIGS. 10G-I illustrates an example visualization of snippet information involving multiple dates, according to various examples. In some examples, a user's request (e.g., a query) to a client module 810 associated with a digital assistant (e.g., 700) may be "Hey Sin, what are the coming holidays this year?" or a question requesting information about important dates and holidays for 2020 and 2021 by invoking the digital assistant. The digital assistant (modules within the snippet visualization system 800) may generate a snippet based on a list of holidays after consulting one or more local or online sources. The information may be presented using a date scale on the user interface or a display associated with the digital assistant, as shown in FIG. 10G.

In the above example, the digital assistant may determine visual representation of dates and holidays in one of a plurality of visual representation formats (compact mode, room mode, immersive mode, etc.) using steps S4-S7 (as suggested in FIG. 9). Specifically, the digital assistant may identify virtual objects (time scale 1054) for visual representation of the holidays based on the format selected for the user. In this example, virtual objects such as time scale 1054 may be used to show the timeline of holidays in a compact mode. Along with time scale 1054, title 1052 stating dates and holidays for 2020 and 2021 are displayed, as shown in FIG. 10G.

In some examples, within the visual representation of the timescale may provide an option for the user to expand the time scale with description about the holiday, as shown in FIG. 10H. For example, a user may select December 10 Hanukkah to retrieve an additional description on Hanukkah. The visualization of the snippet may be expanded to show the description of Hanukkah on a data long view 1058, as shown in FIG. 10H. In some examples, a user may request to change the format mode for visual representation for holiday dates. For example, a user may request to change the mode of visualization from the compact mode to the room mode. As shown in FIG. 10I, visualization of a list of holidays may be shown in real-world background where the virtual objects showing the time scale may be scaled to fit along with objects within the room.

Figure 10J:
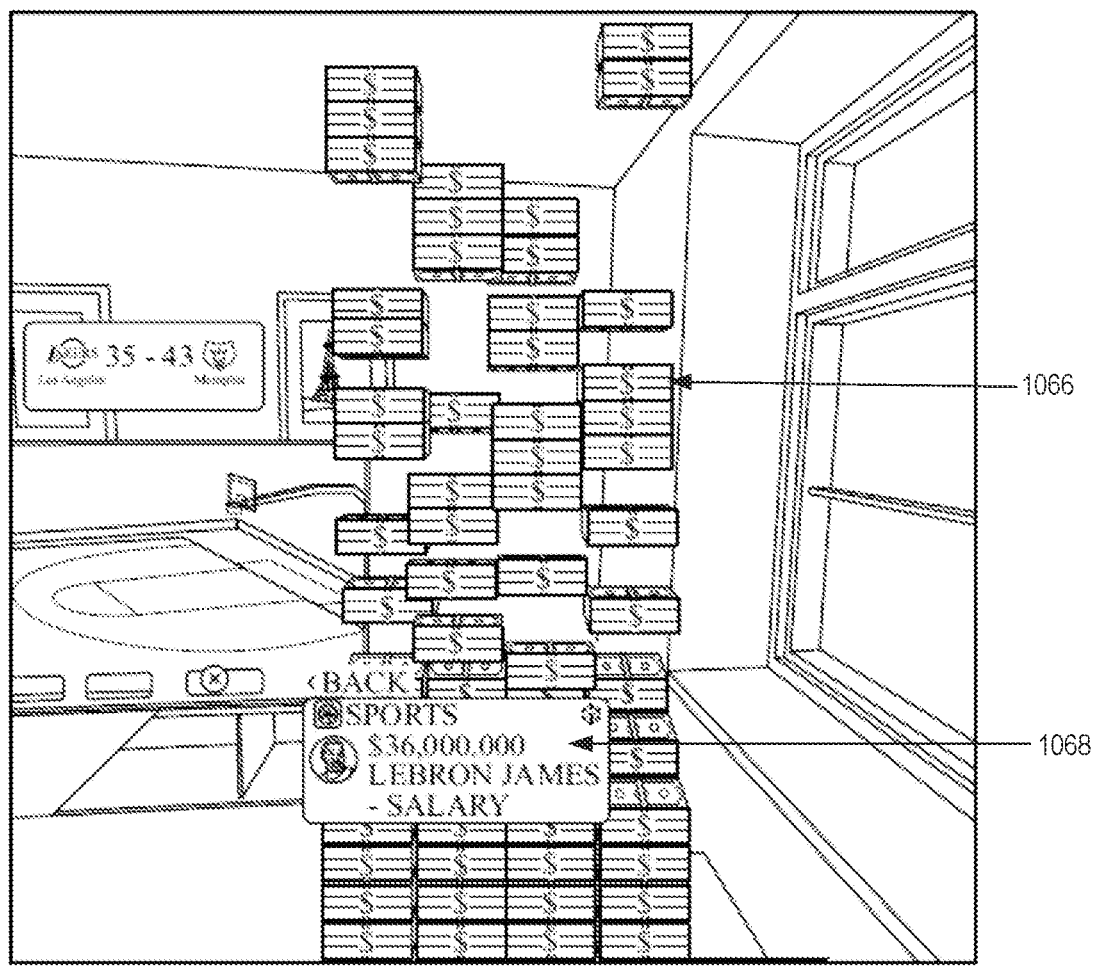
FIG. 10J illustrates an example visualization of snippet information involving quantity data, according to various examples.

FIG. 10J illustrates an example visualization of snippet information involving quantity data, according to various examples. In some examples, a user's request (e.g., a query) to a client module 810 associated with a digital assistant (e.g., 700) may be "Hey Siri, LeBron James's salary?" or a question requesting information about LeBron James's salary by invoking the digital assistant. The search query may be processed and forwarded to the server module 830 where the server module 830 generates a snippet by consulting one or more local or online sources. In this example, the server module 830 may generate a snippet (1068) providing information about LeBron James's salary, and the information may be presented on the user interface or a display associated with the digital assistant, as shown in FIG. 10J.

In the above example, the snippet visualization system 800 may provide visualization of LeBron James's salary in one of a plurality of visual representation formats (compact mode, room mode, immersive mode, etc.) using steps S4-S7 (as suggested in FIG. 9). Specifically, the snippet visualization system 800 may identify virtual objects (stack of dollar bills 1066) for visual representation of LeBron James's salary and display the virtual objects based on the format selected for the user. In this example, virtual objects such as stack of bills 1066 may be used to show the salary of LeBron James in a room or real-world environment mode. As shown in FIG. 10J, the virtual objects (stack of bills 1066) may be shown in different areas of the room surrounding the user and stacked over each other to show the total salary of LeBron James.

Figure 11A:
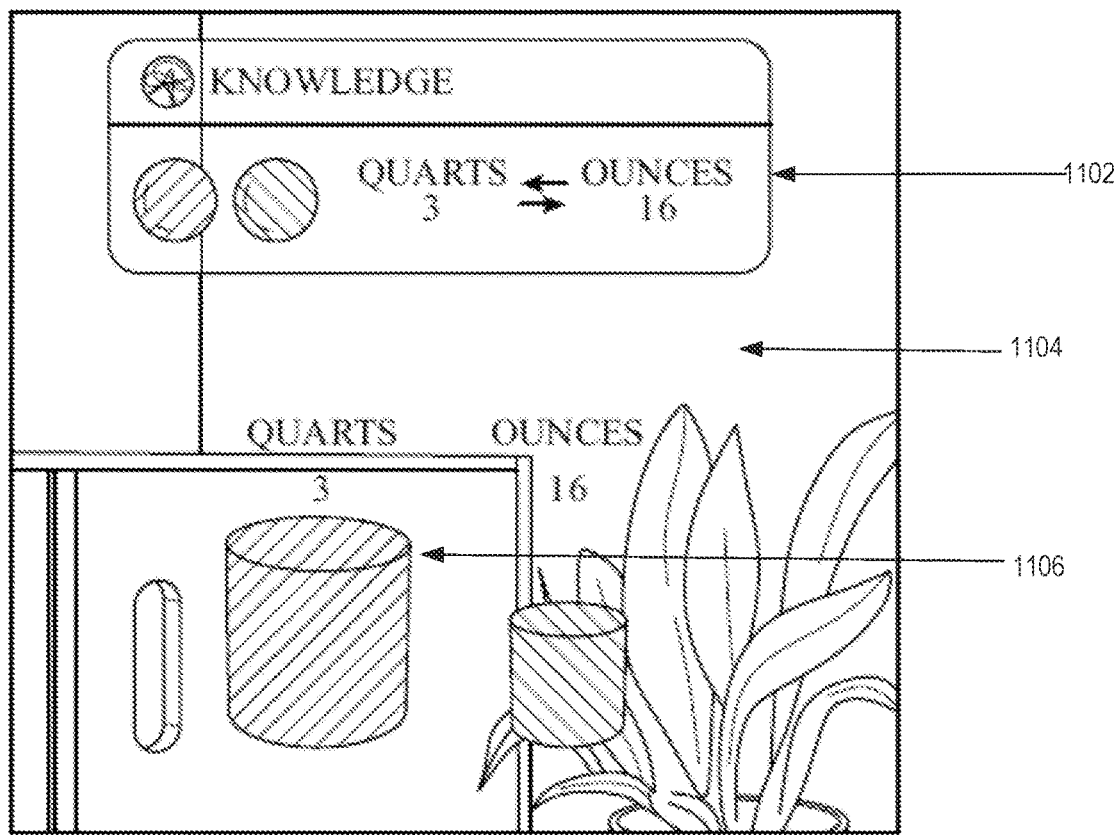
FIG. 11A illustrates an example visualization of snippet information involving volume data in a compact mode, according to various examples.

FIG. 11A illustrates an example visualization of snippet information involving volume data in a compact mode, according to various examples. In some examples, a user may provide a user request (e.g., a query) to a digital assistant (e.g., 700) such as "how much is 1 ounce?" or "convert 1 ounce to quarts" or a question requesting volume information about ounce or quarts by invoking the digital assistant. A snippet response 1012 and visualization of the snippet information 1014 showing volume information is displayed in the compact mode, as shown in FIG. 10B. A user may further request to see the snippet response and visualization of the snippet information to be shown in a real-world environment or a room.

In the above example, in response to the user's request, the digital assistant (or modules within the snippet visualization system 800) may obtain virtual objects for presenting the visualization of volume data, obtain real-world environment surrounding the user, and present the virtual objects in the real-world environment, as shown in FIG. 11A. The snippet 1102 containing an answer to the user's question about volume conversion information and visualization of the snippet information 1106 are shown in room background 1104, as shown in FIG. 11A. In some examples, the position of virtual objects (e.g., cylindrical containers 1106) showing visualization of the snippet information may be adjusted based on objects in the real-world environment (e.g., room) or geometry of the room for better presentation. In addition, the virtual objects may be scaled in accordance with the objects within the room or real-world environment for better presentation.

Figure 11B:
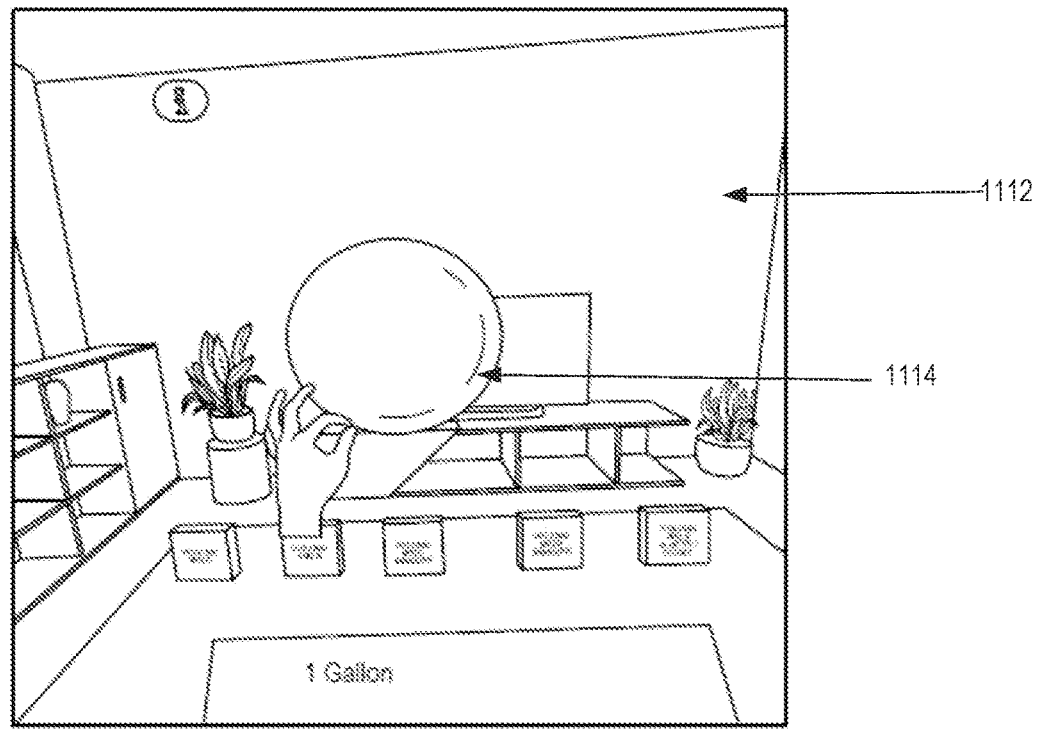
FIG. 11B illustrates an example visualization of snippet information involving volume data in a room mode, according to various examples.
Figure 11C:
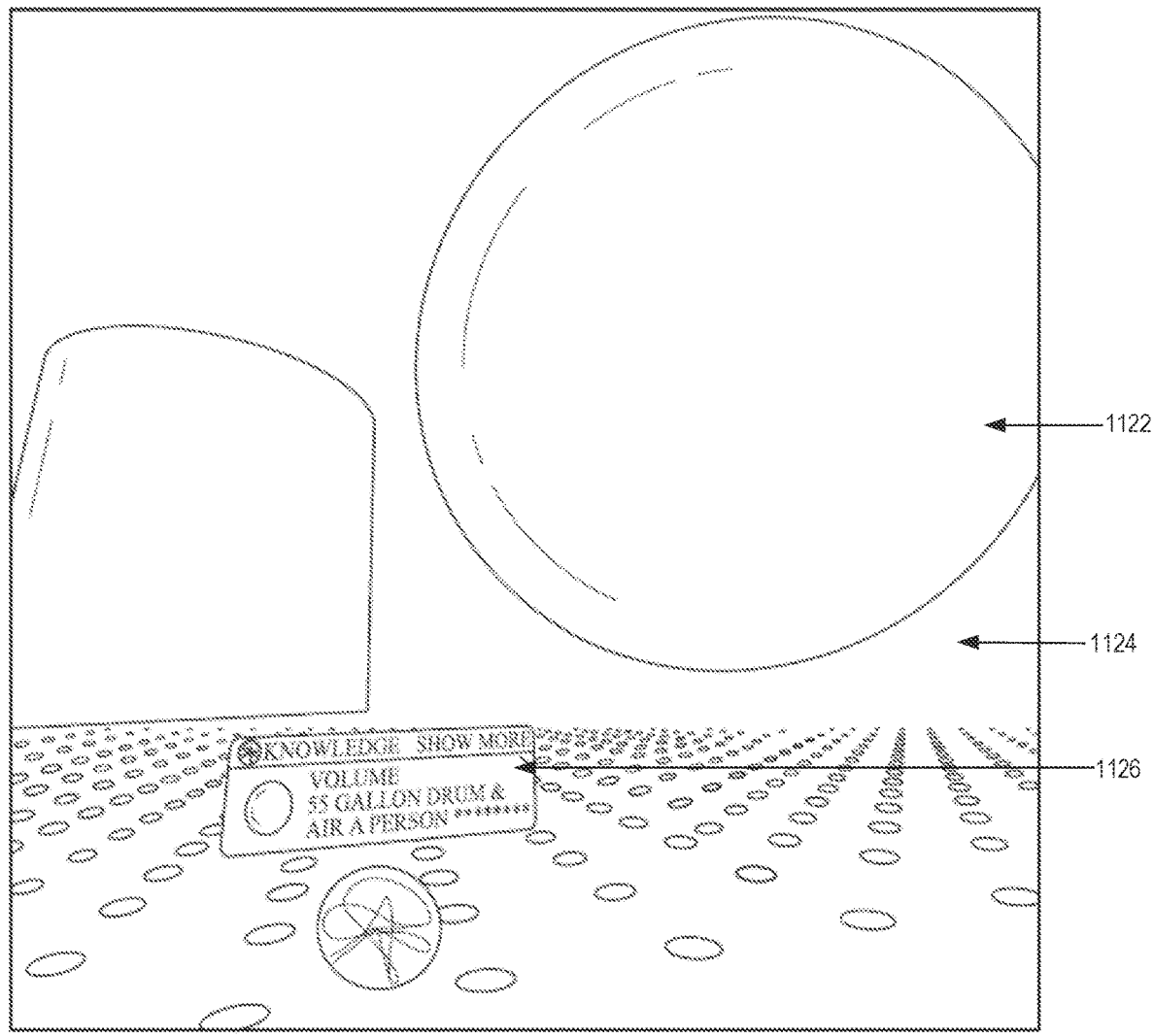
FIG. 11C illustrates an example visualization of snippet information involving volume data in an immersive mode, according to various examples.

FIG. 11B illustrates an example visualization of snippet information involving volume data in a room mode, according to various examples. In some examples, a user's request (e.g., a query) to a digital assistant (e.g., 700) may be "Hey Siri, how much is 1 gallon?" or a question requesting information about a gallon. The search query may be processed and a snippet is generated to provide information about a volume of 1 gallon based on information available within one or more local or online sources. In this example, the digital assistant may generate a snippet providing information about 1 gallon, and the information may be presented on the user interface or a display associated with the digital assistant in a room 1112 or real-world environment mode, as shown in FIG. 11B.

In the above example, the digital assistant may provide visualization of 1 gallon in a room mode using steps S4-S7 (as suggested in FIG. 9). Specifically, the digital assistant may identify virtual objects (object 1114) for visual representation of 1 gallon and display the virtual objects based on the format selected for the user. In this example, virtual objects such as object 1114 may be used to show the volume of 1 gallon in a room mode (room background environment 1112). In the above example, the object 1114 may be scaled according to the objects within the background environment 1112.

FIG. 11C illustrates an example visualization of snippet information involving volume data in an immersive mode, according to various examples. In some examples, a user's request (e.g., a query) to a digital assistant (e.g., 700) may be "Hey Siri, what is the volume of a 55 gallon drum?" or a question requesting information about a gallon. The search query may be processed and a snippet is generated to provide information about a 55 gallon drum based on information available within one or more local or online sources. In this example, the digital assistant (or a module within the snippet visualization system 800) may generate a snippet (1126) providing information about a 55 gallon drum, and the information may be presented on the user interface or a display associated with the digital assistant in an immersive mode, as shown in FIG. 11C.

In the above example, the digital assistant may provide visualization of a 55 gallon drum in real size using steps S4-S7 (as suggested in FIG. 9). Specifically, the digital assistant may identify virtual objects (object 1122) for visual representation of a 55 gallon drum and display the virtual objects based on the immersive mode format selected by the user. In this example, virtual objects such as object 1122 may be used to show the volume of 1 gallon in an immersive mode (with a virtual background environment 1124). In the above examples, the object 1122 may be scaled according to the contextual information or metadata associated with the snippet to show real size and shape of the volume information requested by the user. In some examples, presenting and positioning visualizations of snippet information in an immersive mode or real-world environment may include displaying "floating" virtual objects in front of the user or displaying virtual objects attached to real world objects (e.g., user's desk or coffee table), digital objects, a moving object (e.g., a user's hand), or using other types of positioning and placement arrangement.

FIGS. 12A-12B illustrates an electronic device displaying snippet information and visualization of the snippet information in a compact mode, according to various examples. In some examples, a functionality of the digital assistant (including snippet visualization system 800) may be implemented on user devices such as a mobile device or a tablet and the like. As shown in FIG. 12A, a user may invoke a digital assistant on a mobile device and provide a user request (e.g., a query) to a digital assistant (e.g., 700). In this example, the user request may be "Hey Siri, how fast is Mako Shark?" or "what is a speed of Mako shark?" or a query requesting speed information about Mako Shark after invoking the digital assistant (by tapping on an icon (e.g., 1206) or speech (e.g., "Hey Siri")).

In the above example, the digital assistant (or the client module 810) may receive the search query from the user. The search query may be used for identifying one or more key terms (e.g., "Mako Shark" and "speed") within the search query and intent of the user. The information about one or more key terms (e.g., "Mako Shark" and "speed") and user intent are forwarded to the server module 830. The module 830 may identify one or more local or online sources (e.g., Wikipedia page) involving one or more key terms of the search query. The server module 830 may generate a snippet based on the information available within the one or more sources. In this example, the server module 830 may generate a snippet (e.g., 1212) providing speed information about the Mako Shark, and the snippet may be presented on the user interface 1204 or a display on the user device, as shown in FIG. 12A.

In the above example, the snippet visualization system 800 may provide visualization of the snippet information (e.g., speed) in compact mode using steps S4-S7 (as suggested in FIG. 9). Specifically, the snippet visualization system 800 may identify virtual objects for visual representation (e.g., track with moving object to show speed) of snippet information, size of the virtual objects based on the format selected for the user, and display the virtual objects within a background environment (home screen of the user device). In this example, virtual objects (e.g., a virtual person, 50 meter track, etc.) are displayed in a compact mode that is a condensed form (e.g., virtual objects within predetermined size square or rectangular frame) of visualization of snippet information (1214) on the electronic device, as shown in FIG. 12B. In some examples, the user may request to show speed comparison between different persons or animals or objects. For example, in this example, the user request may be "show speed comparison between Mako Shark and human." Accordingly, the visualization or animation 1214 of snippet information may be updated to show comparison of speed between Mako Shark and human. In some examples, the visualization of snippet information (1214) may still show speed comparison between Mako Shark and human without requiring a user to provide a request for human speed.

In some examples, a visualization module (as discussed in FIG. 8B) may include a reference object for presenting visualization of snippet information. The reference object may be used to put the visualization of information in response to a user's query into a perspective. As discussed in the above example, a reference object for speed may be a human speed to put the speed of Mako Shark into perspective.

Figure 12D:
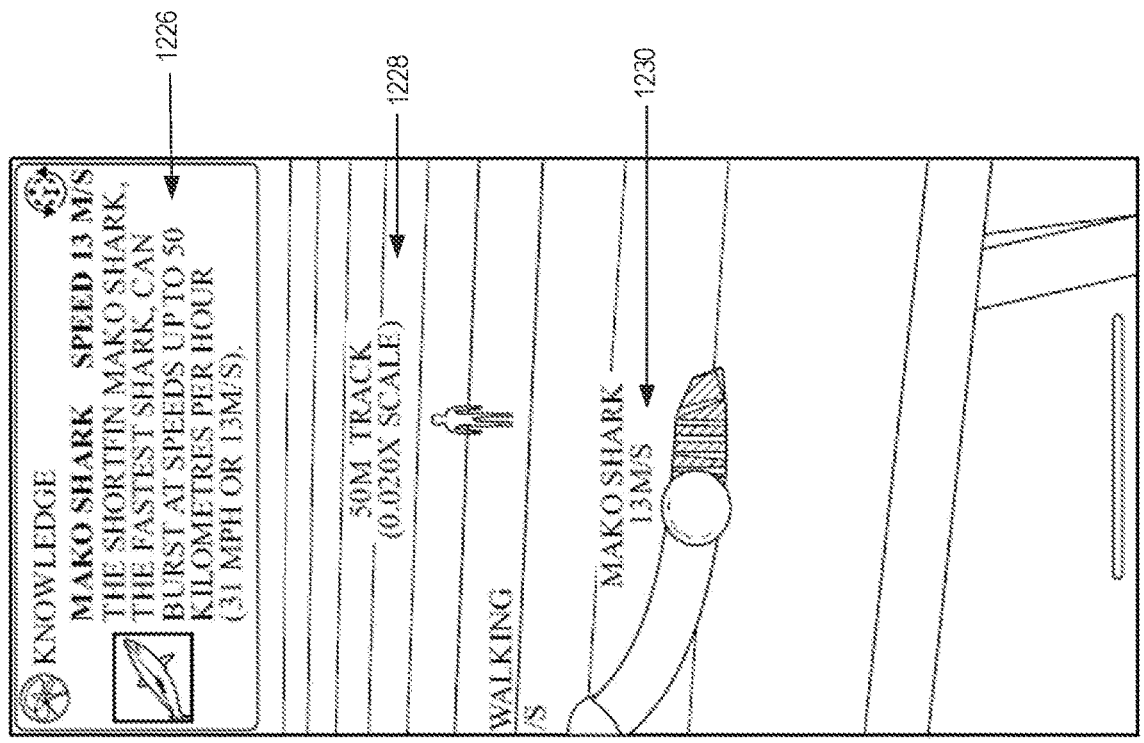
FIGS. 12C-12D illustrate an electronic device displaying visualization of snippet information in room mode and an immersive mode, according to various examples.
Figure 12C:
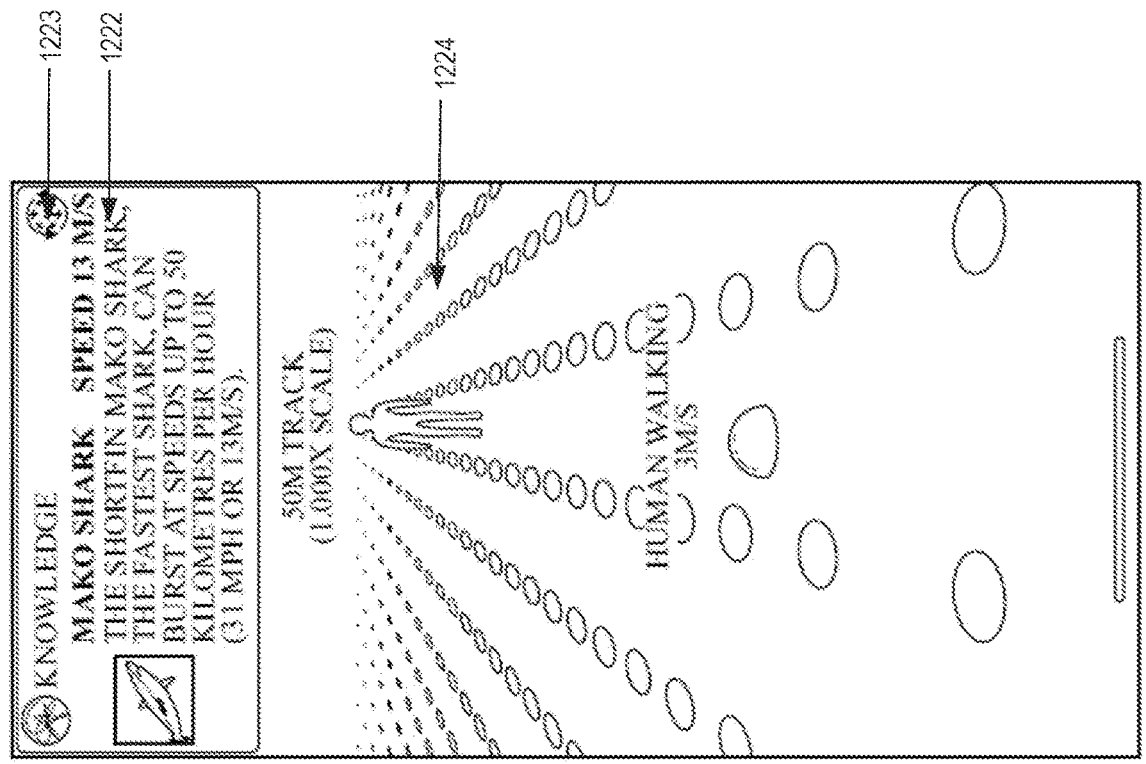

FIGS. 12C-12D illustrate an electronic device displaying visualization of snippet information in a room mode and an immersive mode, according to various examples. In some examples, the digital assistant may request to show the visualization of speed information shown in FIG. 12B in an immersive mode on the electronic device. A user may provide a request to change format mode between compact, immersive, or room mode using a toggle icon (1223) displayed on the electronic device. In response, the digital assistant (or snippet visualization system 800) may identify virtual objects (e.g., a virtual person, 50 meter track, etc.) for visual representation (e.g., track with moving object to show speed) of snippet information, size of the virtual objects based on selected format of immersive mode, and display the virtual objects within a background environment based on the selected format.

In this example, virtual objects (e.g., a virtual person, 50 meter track, etc.) are displayed in an immersive mode. The immersive mode representation may include displaying the snippet information in a computer-generated reality environment or in an animated form configured to present the virtual objects in their real scale (e.g., scale determined based on metadata or contextual information associated with the snippets) in a sequence or a specific order. In the above example, under immersive mode, a 50 meter track is displayed an a Mako shark and a human are animated on the track moving in accordance with their respective speeds, as shown in FIG. 12C.

In the above example, a user may provide a request to change format mode to a real-world environment or room mode by selecting or tapping on the toggle icon on the electronic device. In response, the digital assistant (or snippet visualization system 800) may identify virtual objects (e.g., a virtual person, 50 meter track, etc.) for visual representation of snippet information, scale the virtual objects for real-world background or room mode, and display the virtual objects within a background room environment. In this example, virtual objects (e.g., a virtual person, 50 meter track, etc.) are displayed in a room mode. The room mode representation may include displaying the snippet information in a real-world environment surrounding the user, as shown in FIG. 12D. The virtual objects may be scaled in accordance with different objects or geometry of the room for better presentation.

In some examples, the snippet visualization system 800 (or reality engine 860) may provide additional information about real world surfaces in a geometric format including meshes, planes that define surfaces such as walls, floors, furniture, objects or people. Based on this information, the visualization engine 850 may best fit and position the visualization of snippet information prior to presenting the visualization to the user.

Figure 12E:
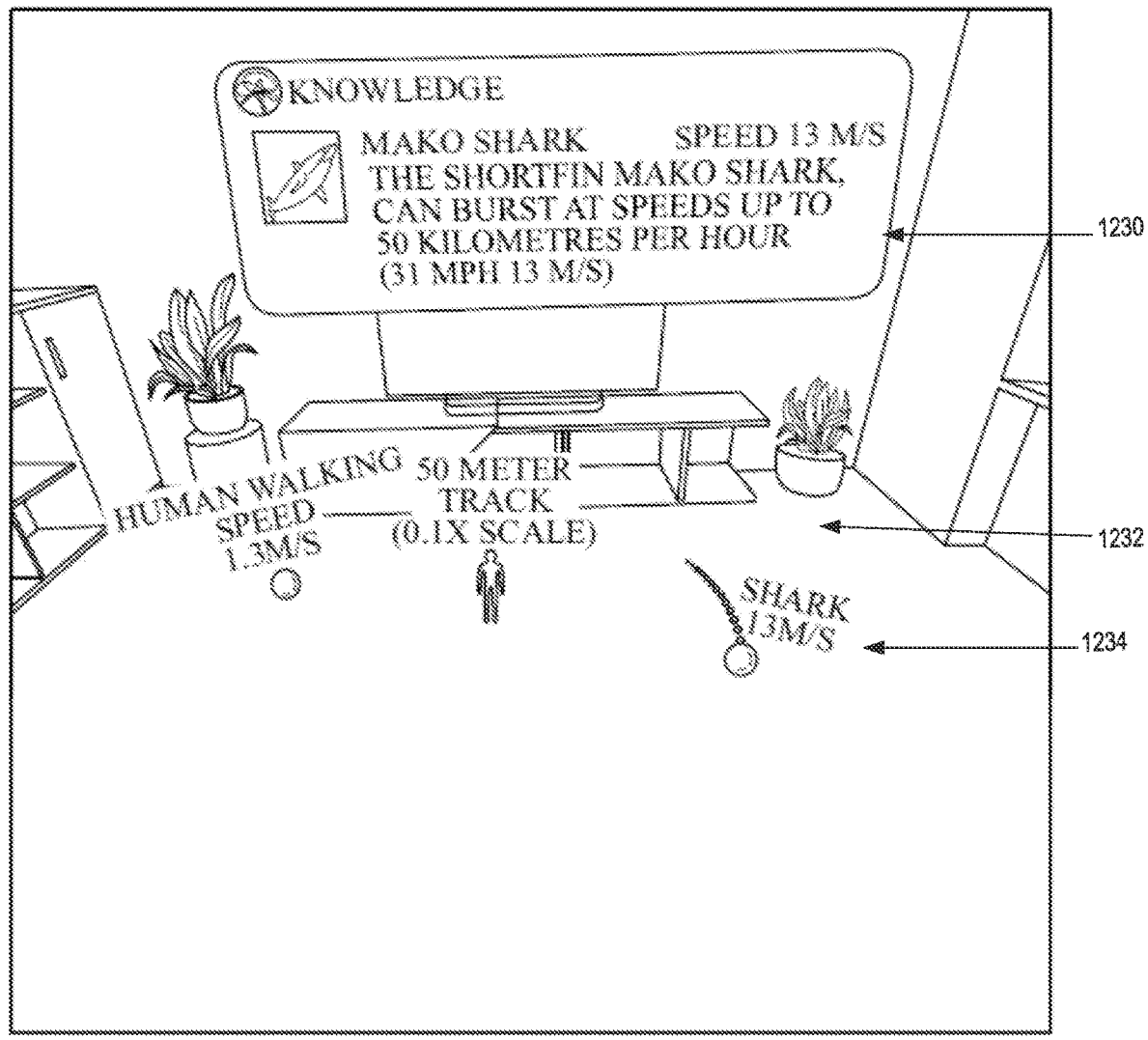
FIG. 12E illustrates an example visualization of snippet information involving speed in a room mode, according to various examples.

FIG. 12E illustrates an example visualization of snippet information involving speed in a room mode, according to various examples. In some examples, the digital assistant may request to show the visualization of speed information shown in FIG. 12B in a real-world environment mode or room mode. In the above example, a user may provide a request to change format mode to a real-world environment or a room mode by selecting a toggle icon on the user interface of the electronic device. In response, the digital assistant (or snippet visualization system 800) may identify virtual objects (e.g., a virtual person, 50 meter track, etc.) for visual representation of snippet information, scale the virtual objects for real-world background or room mode, and display the virtual objects within a background environment based on the format. In this example, virtual objects (e.g., a virtual person, 50 meter track, etc.) are displayed in a room mode or real-world environment surrounding the user. In this example, the positions of virtual objects (e.g., a virtual person, 50 meter track, etc.) may be adjusted based on objects in the room or the geometry in the room for better presentation. For example, as shown in FIG. 12E, the 50 meter track, a virtual human, an object presenting the shark are all shown in the open space in the room next to the television and pots. Accordingly, showing speed comparisons in open space helps the user to properly visualize the speed comparisons.

Figure 13B:
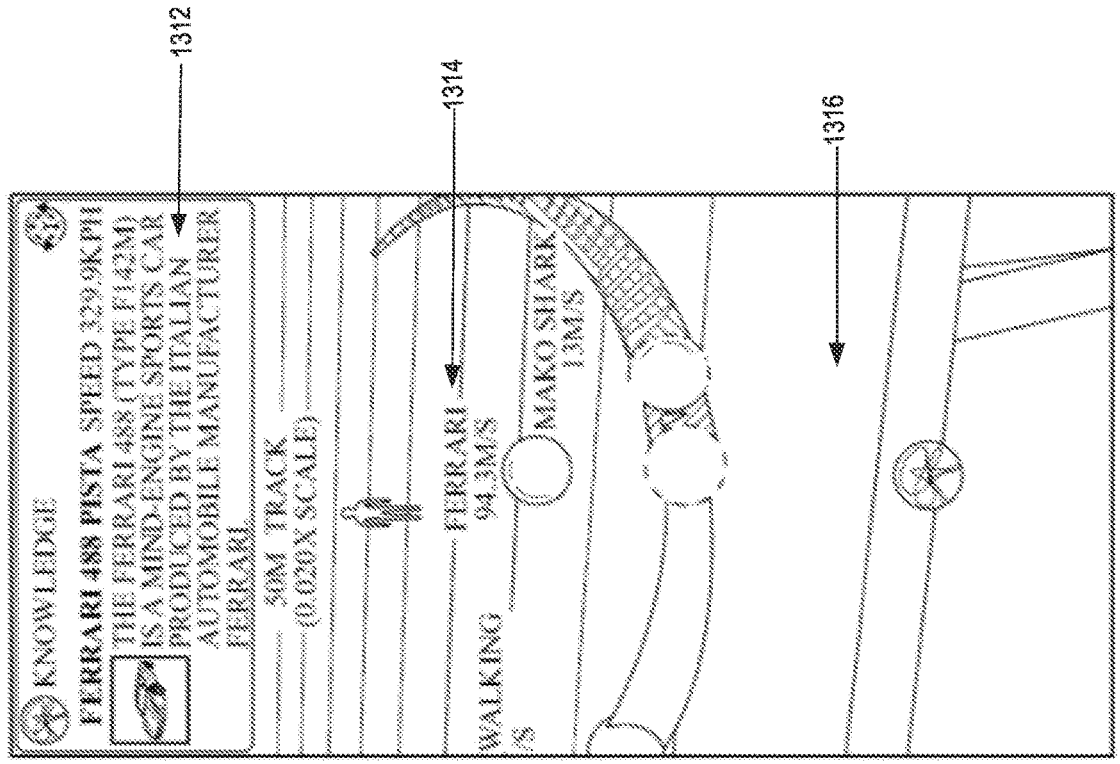
FIGS. 13A-13B illustrate an example visualization of snippet information involving speed in a compact mode and a real-world environment mode (room mode), according to various examples.
Figure 13A:
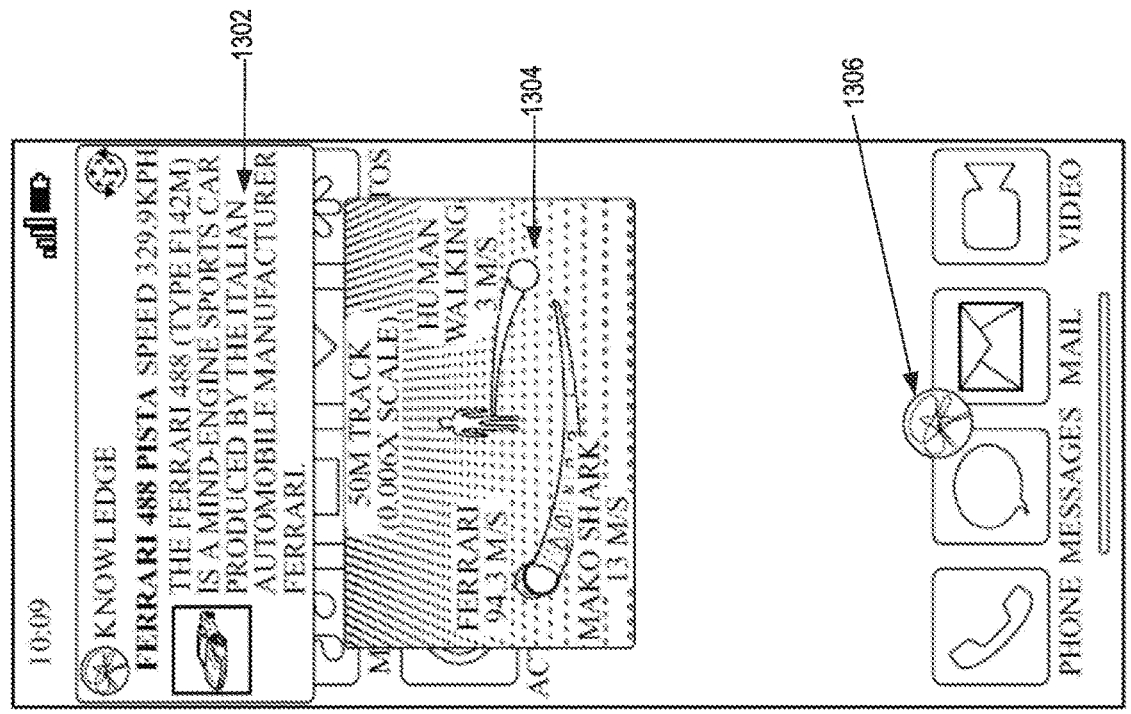

FIGS. 13A-13B illustrate an example visualization of snippet information involving speed in a compact mode and a room mode, according to various examples. Specifically, FIG. 13A discloses updates to the visualization of speed information shown in FIG. 12B. In some examples, while the snippet 1212 and visualization of speed information (1214) about the human and Mako Shark is shown in a compact mode in FIG. 12B, a user may provide an additional user request or query "How fast is Ferrari?" or "What about the speed of a Ferrari?" or "what is the speed of a Ferrari 488?" or other queries inquiring about speed information and/or speed comparison of Ferrari with previously requested speed information about other objects.

In the above example, in response to additional user requests or queries about speed of a Ferrari, the digital assistant may generate a snippet including speed information about Ferrari after consulting one or more local or online sources. The snippet on the electronic device may be updated from 1212 (as shown in FIG. 12B) to 1302 (as shown in FIG. 13A) to show the answer to the user's latest question or request. The visualization of snippet information may be further updated to show comparison between the answers of the user's latest request and prior requests. For example, the snippet visualization 1214 (as shown in FIG. 12B) may be updated to show speed comparisons between Ferrari, Mako Shark, and human.

In the above example, once the visualization of snippet information 1214 is presented to the user, the user may request to view the speed comparisons in a real-world environment or a room mode. The user may provide a request to change format mode to a real-world environment or room mode by selecting a toggle icon on the electronic device. In response, the digital assistant (or snippet visualization system 800) may identify virtual objects (e.g., a virtual person, 50 meter track, virtual shark object, virtual Ferrari object, etc.) for visual representation of snippet information, scale the virtual objects for real-world background or room mode, and display the virtual objects within a background environment based on the format. In this example, virtual objects (e.g., a virtual person, 50 meter track, virtual shark object, virtual Ferrari object, etc.) are displayed in a real-world environment surrounding the user, as shown in FIG. 13B.

Figure 14A:
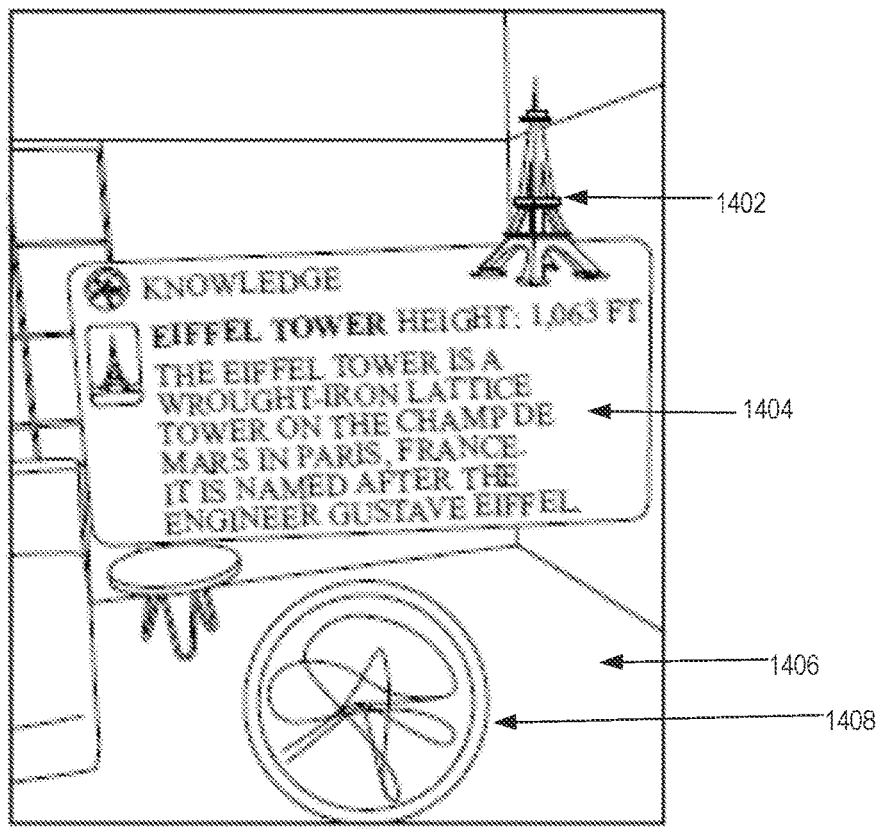
FIG. 14A illustrates an example visualization of snippet information involving three-dimensional object in a room mode, according to various examples.

FIG. 14A illustrates an example visualization of snippet information involving three-dimensional objects in a room mode, according to various examples. In some examples, a user may provide a request to a digital assistant, the request may be "Hey Siri, what is the height of the Eiffel Tower?" or "How tall is the Eiffel Tower?" or a query requesting information about the height of the Eiffel Tower after invoking the digital assistant (by tapping icon 1408). In response to the user's request, a snippet 1404 showing height information about Eiffel Tower may be presented. In addition to the snippet, a mini version of the Eiffel Tower (1402) may be shown on top of the snippet 1404. The mini version of the Eiffel Tower (1402) may be a three-dimensional object (or virtual object) of the Eiffel Tower. In some examples, plurality of virtual objects or three-dimensional objects may be required to display the mini version of Eiffel Tower 1402. In the above example, both snippet 1404 and virtual object Eiffel Tower (1402) are shown in a room mode with the environment surrounding the user is shown in the background.

In some examples, a user may pluck and move the three-dimensional object 1402 in the room or within any real-world or a virtual background environment. In addition, a user may drag and drop, copy and paste, store, or print the three-dimensional object 1402 to other applications on the electronic device. In the above example, both the snippet and virtual objects are shown with a real-world background environment (e.g., a room mode). In some examples, the user's request to move the Eiffel Tower object 1402 may be a hand gesture for plucking and moving visualization of a snippet. In the above example, the user may request to move the virtual object from one background environment to another background environment. For example, the user may request to move the virtual object from a compact mode to a room or real-world environment mode. For example, a user may request to move the mini display of Eiffel Tower (or a virtual object) showing in a compact mode with a virtual background on an electronic device to a user's room (as shown in FIG. 14A). In this example, the virtual object 1402 presenting the display of the Eiffel Tower may be scaled in accordance with the room's geometry (e.g., room's ceiling) for better presentation.

Figure 14B:
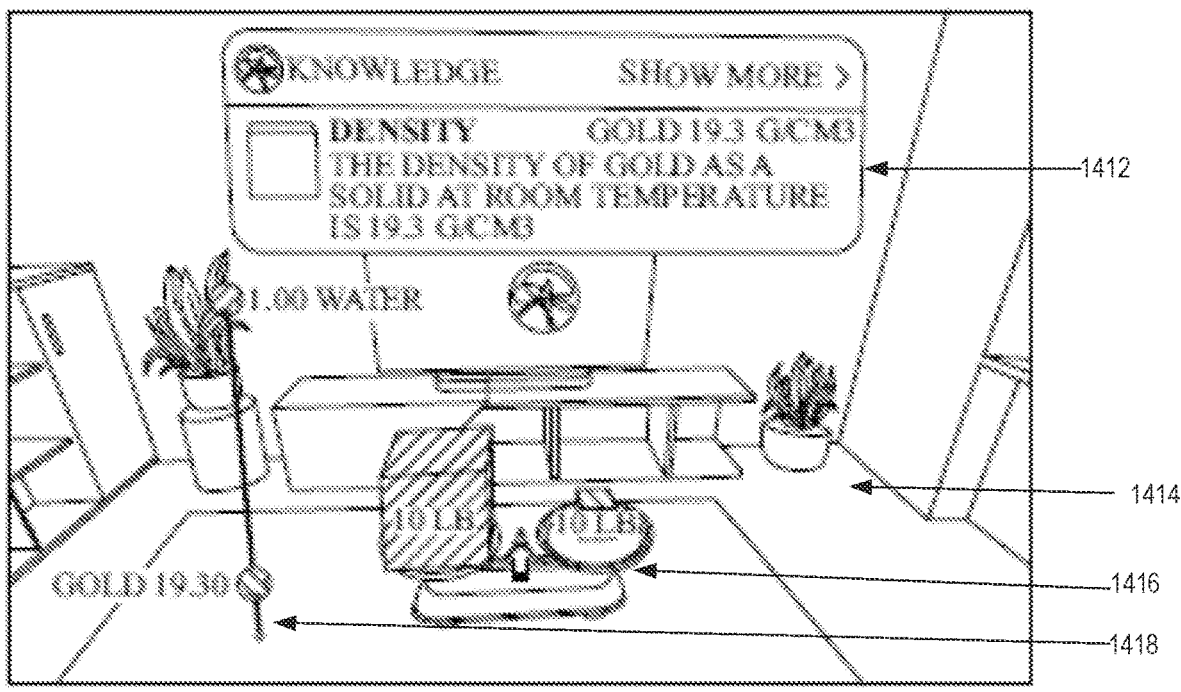
FIG. 14B illustrates an example visualization of snippet information involving density data in a room mode, according to various examples.

FIG. 14B illustrates an example visualization of snippet information involving density data in a room mode, according to various examples. In some examples, a user's request (e.g., a query) to a client module 810 associated with a digital assistant (e.g., 700) may be "what is the density of gold?" or "compare density of gold with water" or a question requesting density information about gold by invoking the digital assistant. The search query (or relevant terms) may be processed and forwarded to the server module 830 where the server module 830 generates a snippet based on the gold's density related information available within one or more sources (e.g., Wikipedia). In this example, the server module 830 may generate a snippet (e.g., 1412) providing density information about gold and water, and the information may be presented on the user interface or a display associated with the digital assistant, as shown in FIG. 14B.

In addition, the snippet visualization system 800 may provide visualization of the snippet information (e.g., gold density) in a real-world environment mode or room mode using steps S4-S7 (as suggested in FIG. 9). Specifically, the snippet visualization system 800 may identify virtual objects for visual representation of gold's density information, scale the virtual objects based on the geometry of the real-world environment surrounding the user (e.g., room), and display the virtual objects within a real-world environment. In this example, virtual objects such as balance scale 1416, density of gold and water shown in cube format, comparison of density on a line scale 1418 are displayed in a room mode. In this example, the positions of virtual objects (e.g., balance scale 1416, line scale 1418, etc.) may be adjusted based on objects in the room or the geometry in the room for better presentation. For example, as shown in FIG. 14B, the balance scale 1416 and line scale 1418 are shown in the open space in the room next to the TV and pots. Accordingly, showing speed comparisons in open space helps the user to properly visualize the speed comparisons.

FIGS. 15A-15B illustrate an example of snippet information and visualization of snippet information involving size data in a room mode, according to various examples. In some examples, the user request may be a query or a question inquiring information about a person, object, or general knowledge item. For example, in an example, a user may send a query to the digital assistant. The query may be "Hey Siri, how tall is Lebron James?" or "what is Lebron James's height?" or a query requesting height information about Lebron James by invoking an icon for a digital assistant (e.g., 1504).

In some examples, the digital assistant may search and consult multiple sources (e.g., Wikipedia, Google Search, etc.) to retrieve the answer to a user's query. The digital assistant may generate a snippet and title for the snippet to best represent and describe a result to the user's query, and explain how it relates to the user's query. Accordingly, in response to receiving the user's request, the digital assistant may provide an answer to be shown as a snippet 1502 in response to a user query.

In the above example, the user may request to view visualization of the height information in a real-world environment or a room mode. The real-world environment or room mode representation may include displaying one or more virtual objects within a real-world background environment where the virtual objects are scaled to fit along with objects within the real-world background. For example, in the above example, virtual objects (e.g., scaled virtual person 1514, height scale 1512, etc.) used for presenting the height of Lebron James may be shown within a room 1518 surrounding a user, as shown in FIG. 15B. In this mode, the virtual objects are scaled based on the information available within the metadata or contextual information and objects within the background environment. For example, if the ceiling of the room is 10 feet tall, the height scale 1512 and virtual person 1514 may be displayed in their real scales (e.g., 6' 9") because the visualization would fit into the room. The snippet visualization system 800 may scale any visualizations (or virtual objects) to fit within the extent of the room or any other volume or space. In some examples, if the visualization is intended to demonstrate real or scale but virtual objects are scaled less than or greater than the true scale then the snippet visualization system 800 may provide a reference scale ruler or an object for comparison (e.g., as shown in FIG. 15B).

5. Processes for Providing Visualization of Snippets on an Electronic Device

Figure 16:
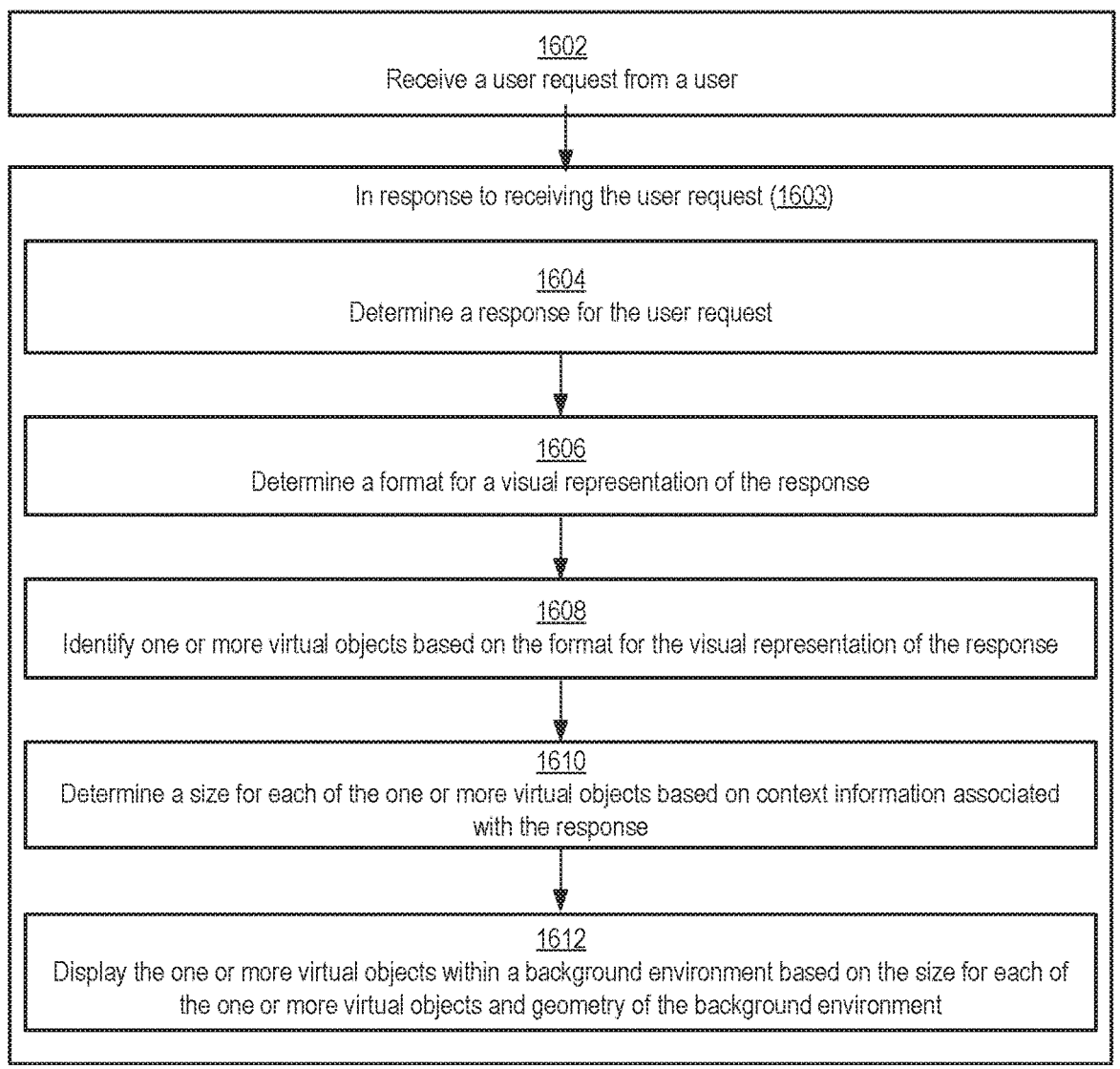
FIG. 16 illustrates a process for displaying visualization of snippet information, according to various examples.

FIG. 16 illustrates a process for displaying visualization of snippet information, according to various examples. Process 1600 is performed, for example, using one or more electronic devices implementing a digital assistant (e.g., electronic devices 600). In some examples, one or more blocks of process 1600 are performed by one or more remote devices (e.g., one or more remote servers, one or more local servers, a cloud computing system, and/or the like). Alternatively, the one or more blocks of process 1600 are performed by the one or more client electronic devices implementing a digital assistant.

For example, the blocks of process 1600 are divided up in any manner between one or more servers (e.g., DA server 106 or 830) and a client device (e.g., electronic device 600). Thus, while portions of process 1000 are described herein as being performed by particular devices, it will be appreciated that process 1600 is not so limited. In another example, the process 1600 is performed using only a client device (e.g., electronic device 600) or multiple client devices. In process 1600, some blocks are, optionally, combined, the order of some blocks is, optionally, changed, and some blocks are, client devices (e.g., electronic device 600), optionally, omitted. In some examples, additional steps may be performed in combination with the process 1600.

In some examples, the electronic device (e.g., a personal or client electronic device (e.g., a mobile device (e.g., iPhone®), a tablet computer (e.g., iPad®), a smart watch (e.g., Apple Watch®), a desktop (e.g., iMac®), or a laptop (e.g., MacBook®)) or a communal electronic device (e.g., a smart TV (e.g., Apple TV®) or a smart speaker (e.g., HomePod®))) (e.g., user device 600) may be connected to a communications network (e.g., local area networks (LAN) or wide area networks (WAN), e.g., the Internet). The electronic device may include a display (e.g., 212) which may provide an input interface and an output interface between the electronic device and a user. The input interface may be an icon of a digital assistant (e.g., 1002 in FIG. 10A) for a user to provide user requests. The display (e.g., 212) displays a visual output to the user. The visual output includes three-dimensional or two dimensional graphics, text, icons, video, and any combination thereof.

In some examples, at block 1602, a client module or a user interface of the electronic device (e.g., 600) receives a user request. In some examples, the request may be a query about a person, an object, location, general knowledge information, or any other type of information. At block 1603, in response to receiving the user request, steps 1604, 1606, 1608, 1610, and 1612 are performed by one or more processors associated with the electronic device.

At block 1604, the electronic device determines a response for the user request. The electronic device (e.g., modules 820 and 830) (or one or more processors within the electronic device) may identify one or more key terms within the user request and determine an actionable intent of the user. The electronic device may further identify one or more local or online sources involving one or more key terms of the search query and generate a snippet (or a response) based on the information available within the one or more sources. In the above example, the snippet or response may be presented on the user interface or a display associated with the electronic device (as shown in FIG. 15A).

At block 1606, the electronic device determines a format for a visual representation of the response. In some examples, the electronic device may prompt a user to select a format from the list of the formats for a visual representation. Alternatively, a format may be chosen without prompting or presenting a format list to the user. The electronic device may determine a format based on a user's history or preferences. In some examples, a format may be a system defined format (e.g., a specific visualization may be shown only in a specific mode) or a "best fit" format based on physical environment (e.g., choosing to show visualization in a room mode if there is enough physical space or choosing to show visualization in a compact mode based on user's activities, activities in real-world environment, or virtual applications that may be simultaneously running on the electronic device). In some examples, the format for the visual representation includes at least one of a compact mode, an immersive mode, and real-world environment mode.

At block 1608, the electronic device may identify one or more virtual objects based on the format for the visual representation of the response. In some examples, each of the one or more virtual objects is a Graphical User Interface (GUI) component in a virtual three-dimensional space. In some examples, the one or more objects are identified based on the time it may take to present the one or more virtual objects to the user. For example, in response to a user's query about the salary of Lebron James (as shown in FIG. 10J), a stack of money (virtual objects) may be shown as a visual representation of his salary. The visualization of Lebron James's salary may be presented using stacks of money of a certain amount one by one until the whole salary is shown using the stacks of money. Here, the stacks (virtual objects) of a certain amount are chosen based on the amount of time the visual representation may take to show the salary to the user. For example, if a stack of one dollar bills is chosen to present the salary, it would take a long time to present a salary of 36 million dollars (as shown in FIG. 10J) to the user. Instead, stacks of higher bills are chosen for presenting the salary to the user based on the total time it may take to present the salary to the user. In some examples, the visual representation of the response may need to be presented to a user within a predetermined time. Accordingly, certain virtual objects and their properties are selected in order to present the animation or visualization of the snippet information to the user within the predetermined time.

At block 1610, the electronic device may determine a size for each of the one or more virtual objects based on context information associated with the response. Specifically, the electronic device may determine a size of each of the virtual objects based on the format selected for the user (e.g., compact mode, room mode, or immersive mode), and contextual information associated with the snippet. For example, if a compact mode is selected for visualization then virtual objects may be scaled to fit into frame or block allocated for the visualization (as shown in FIG. 10B) in the compact mode. At the same time, while scaling the virtual objects, the context information about the snippet is considered. For example, as shown in FIG. 10B, cylindrical containers presenting quarts and ounces are scaled to correctly present comparison between 3 quarts and 16 ounces.

At block 1612, the electronic device may display the one or more virtual objects within a background environment based on the size for each of the one or more virtual objects and geometry of the background environment. In some examples, displaying the one or more virtual objects within the background environment on the electronic device includes ranking or ordering the one or more virtual objects to be displayed within the background environment and presenting the one or more virtual objects within the background environment in a sequence based on the ranking. Further, the virtual objects are presented in a sequence within a predetermined time-period.

In some examples, the electronic device displays the one or more virtual objects within the background environment includes creating an animation involving the one or more virtual objects within the background environment and presenting the animation on a user interface within the electronic device. Further, the one or more virtual objects are scaled based on a size associated with at least one object in the background environment and presented within the background environment. In some examples, to scale the virtual objects, the electronic device may determine a size of each of the virtual objects based on context information associated with the response.

In the above examples, the electronic device may determine a size and shape of at least one object within the background environment based on the geometry of the background environment, and adjust the size of each of the virtual objects based on the size and shape of the at least one object in the background environment. In some examples, the electronic device may display one or more virtual objects within the background environment based on the capabilities of the electronic device. For example, if the electronic device is a device without camera or video capture capabilities, the virtual objects within the background environment may be shown using a virtual environment instead of real-world environment mode. In some examples, the virtual environment is a two-dimensional or three-dimensional image.

In some examples, a user may request to move one or more virtual objects within the background environment with a hand gesture or other methods. In response, the electronic device may move the virtual objects in accordance with a direction requested by the user. For example, a user may be able to move a virtual objects presenting an object (e.g., a chair) or a person within a real-world environment (e.g., a room) in order to view the virtual object next to or close to a real-world environment object (e.g., a table) within the environment (e.g., room). The real-world environment is a surrounding environment of the user providing the user request.

In some examples, the electronic device may display the virtual objects on a portion of a user interface along with the user request and the response. In some examples, the virtual objects are displayed on a first user interface of the electronic device and the response along with user request on a second user interface of the electronic device. In some examples, the response may be a snippet presenting information requested by the user in the user request. For example, as shown in FIG. 10A, in response to the user's request of "how fast is Mako Shark," a user interface of the electronic device may display the response in form of a snippet 1004 in a first portion of the user interface and visualization of the snippet 1006 using virtual objects in a second portion of the user interface.

In some examples, the visual representation of the response may be presented based on a state of the user or activities on the electronic device. For example, if a user request is provided while the user is driving, the response may be provided to the user without including visualization of the response. In other example, if the user has other content open on a portion of the user interface and there is no space for presenting the visualization of the response, the visualization may not be presented to the user. Alternatively, other content or applications open and displayed on the user device may be closed to allow visual representation of the response.

Figure 17:
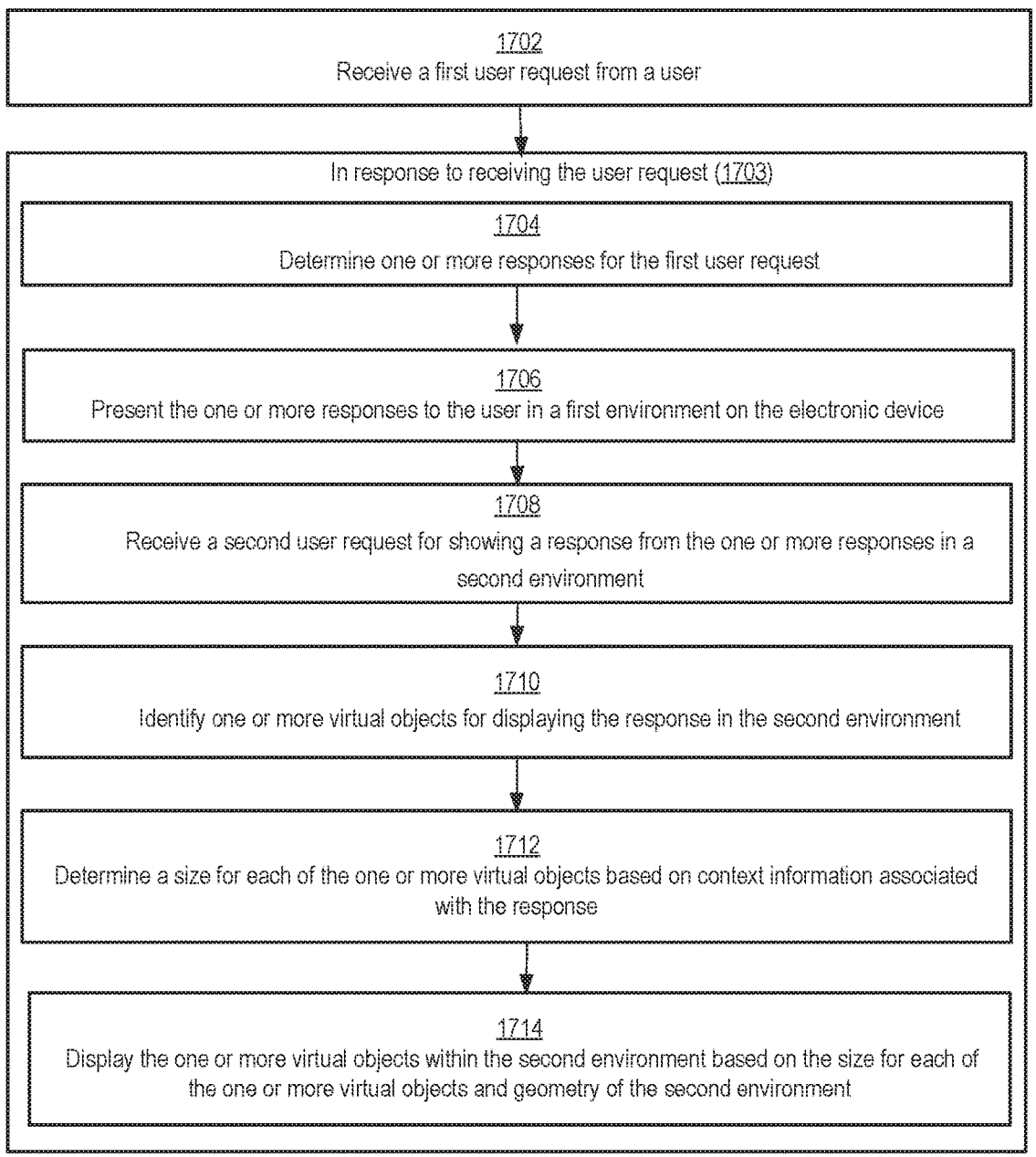
FIG. 17 illustrates a process for displaying a three-dimensional object from a first environment into a second environment, according to various examples.

FIG. 17 illustrates a process for displaying a three-dimensional object from a first environment into a second environment, according to various examples. Process 1700 is performed, for example, using one or more electronic devices (e.g., 600) implementing a digital assistant. In some examples, one or more blocks of process 1700 are performed by one or more remote devices (e.g., one or more remote servers, one or more local servers, a cloud computing system, and/or the like). Alternatively, the one or more blocks of process 1700 are performed by the one or more client electronic devices implementing a digital assistant. For example, the blocks of process 1600 are divided up in any manner between one or more servers (e.g., DA server 106 or 830) and a client device (e.g., 600). Thus, while portions of process 1700 are described herein as being performed by particular devices, it will be appreciated that process 1700 is not so limited. In other examples, process 1700 is performed using only a client device (e.g., electronic device 600) or multiple client devices. In process 1700, some blocks are, optionally, combined, the order of some blocks is, optionally, changed, and some blocks are, client devices (e.g., 600), optionally, omitted. In some examples, additional steps may be performed in combination with the process 1700.

In some examples, the electronic device may be connected to a communications network (e.g., local area networks (LAN) or wide area networks (WAN), e.g., the Internet). The electronic device may include a display (e.g., 212) which may provide an input interface and an output interface between the electronic device and a user. The input interface may be an icon of a digital assistant (e.g., 1002 in FIG. 10A) for a user to provide user requests. The display (e.g., 212) displays a visual output to the user. The visual output includes three-dimensional or two dimensional graphics, text, icons, video, and any combination thereof.

In some examples, at block 1702, a client module or a user interface of the electronic device (e.g., 600) receives a first user request. In some examples, the first request may be a query about a person, an object, location, general knowledge information, or any other type of information. At block 1703, in response to receiving the first user request, steps 1704, 1706, 1708, 1710, 1712, and 1614 are performed by one or more processors associated with the electronic device.

At block 1704, the electronic device determines a response for the first user request. The electronic device (e.g., modules 820 and 830) (or one or more processors within the electronic device) may identify one or more key terms within the first user request and determine an actionable intent of the user. The electronic device may further identify one or more local or online sources involving one or more key terms of the search query and generate a snippet (or a response) based on the information available within the one or more sources. In the above example, the snippet or response may be presented on the user interface or a display associated with the electronic device (as shown in FIG. 15A).

At block 1706, the electronic device presents one or more responses to the user in a first environment on the electronic device. Specifically, the electronic device may identify one or more virtual objects based on a format for the visual representation of the response. In some examples, each of the one or more virtual objects is a Graphical User Interface (GUI) component in a virtual three-dimensional space. For example, as shown in FIG. 14A, in response to the user's query (e.g., a first user request) "what is height of Eiffel Tower?" a snippet 1404 showing height information about Eiffel Tower may be presented. In addition to the snippet, one or more virtual objects displaying a mini version of Eiffel Tower (1402) may be displayed, as shown in FIG. 14A. In the above example, both the snippet and virtual objects are shown with a virtual background environment. In some examples, the first environment is a virtual environment including a two-dimensional or a three-dimensional image.

At block 1708, the electronic device may receive a second user request for showing a response from one or more responses in a second environment. In some examples, the second user request may be a hand gesture for moving visualization of a snippet from the first environment to a second environment. For example, in FIG. 14A, a user may request to move the mini display of Eiffel Tower 1402 to a room surrounding a user.

At block 1710, the electronic device may identify or obtain one or more virtual objects for displaying the response in the second environment. In the above example, upon receiving the second user request to move the Eiffel Tower 1402 from virtual background to real-world background (e.g., room), the electronic device may identify virtual objects or components (showing Eiffel Tower 1402) requiring repositioning based on the second user request. In some examples, obtaining virtual objects for displaying the response in the second environment include creating one or more virtual objects based on the response or obtaining one or more virtual objects based on the response from a database. A virtual object is a two-dimensional or a three-dimensional object.

At block 1712, the electronic device may determine a size for each of the one or more virtual objects based on context information associated with the response. In some examples, the electronic device may consult metadata (as described in FIG. 9) or snippet information to obtain size for the virtual objects. For examples, if a user requests to view a table or a chair from a virtual environment or a first environment (e.g., online shopping website) to a real-world environment or a second environment (e.g., within a room), upon receiving the second request, the electronic device may refer to dimension information associated with the objects (e.g., table or chair) to construct and show realistic version of objects within the second environment (e.g., room)

At block 1714, the electronic device may display the one or more virtual objects within the second environment based on the size for each of the one or more virtual objects and geometry of the second environment. Specifically, in some examples, one or more virtual objects are scaled based on a size associated with at least one object in the second environment. For example, if the size of virtual objects may be scaled based on the ceiling of a room (a second environment) prior to presenting virtual objects in the second environment. In some examples, the electronic device may determine a size and a shape of objects within the second environment based on the geometry of the second environment. Further, the electronic device may adjust the size of each of the one or more virtual objects based on the size and shape of at least one object in the second environment. In some examples, the electronic device may further allow a user to move one or more virtual objects within the second environment.

The operations described above with reference to FIGS. 10A-15B are optionally implemented by components depicted in FIGS. 1-4, 6A-B, 7A-C, 8A-8B, and 9. For example, the operations of process 1600 and/or process 1700 may be implemented by system 100 or 800. It would be clear to a person having ordinary skill in the art how other processes are implemented based on the components depicted in FIGS. 1-4, 6A-B, 7A-C, 8A-8B, and 9.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to quickly provide access to desired set of actions to a user viewing or browsing content on an electronic device. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide visualization of snippet information in the user's preferred format. Accordingly, use of such personal information data enables users to access most desirable and accurate presentation of snippet information based on users' preferred formats and previous queries of the users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the providing visual representation of snippets, the present technology can be configured to allow users to select to "opt in" or "opt out" of participation in the collection of personal information data during registration for services or anytime thereafter. In another example, users can select not to provide access to their location information or contacts information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, suggestive actions can be determined and provided to users by inferring preferences based on non-personal information data or a bare minimum amount of personal information, such as the content being requested by the device associated with a user, other non-personal information available to predictive models for contextual action prediction services, or publicly available information.

What is claimed is:

1. A non-transitory computer-readable storage medium storing one or more programs, the one or more programs comprising instructions, which when executed by one or more processors, cause an electronic device to:
    receive, from a user, a user request;
    in response to receiving the user request:
        determine a response for the user request;
        determine a format for a visual representation of the response;
        identify one or more virtual objects based on the format for the visual representation of the response;

determine a size for each of the one or more virtual objects based on context information associated with the response; and display the one or more virtual objects within a background environment based on the size for each of the one or more virtual objects and geometry of the background environment.

2. The non-transitory computer-readable storage medium of claim 1, wherein the user request is a natural language input in form of a spoken or textual command presented at the electronic device.

3. The non-transitory computer-readable storage medium of claim 1, wherein determining the format for the visual representation comprises:

prompting the user to select a format from a list of formats; and receiving, from the user, a format selected from the list of formats.

4. The non-transitory computer-readable storage medium of claim 3, wherein determining the format for the visual representation comprises:

determining a format from the list of formats based on user's historical format selections.

5. The non-transitory computer-readable storage medium of claim 1, wherein the format for the visual representation includes at least one of a compact mode, a real-world environment mode and an immersive mode.

6. The non-transitory computer-readable storage medium of claim 1, wherein each of the one or more virtual objects is a Graphical User Interface (GUI) component in a virtual three-dimensional space.

7. The non-transitory computer-readable storage medium of claim 1, wherein displaying the one or more virtual objects within the background environment on the electronic device comprises:

ranking the one or more virtual objects to be displayed within the background environment; and presenting the one or more virtual objects within the background environment in a sequence based on the ranking, wherein the one or more virtual objects are presented within a predetermined time-period.

8. The non-transitory computer-readable storage medium of claim 1, wherein displaying the one or more virtual objects within the background environment on the electronic device comprises:

creating an animation involving the one or more virtual objects within the background environment; and presenting the animation on a user interface within the electronic device.

9. The non-transitory computer-readable storage medium of claim 1, wherein displaying the one or more virtual objects within the background environment comprises:

scaling the one or more virtual objects based on a size associated with at least one object in the background environment; and presenting the one or more scaled virtual objects within the background environment.

10. The non-transitory computer-readable storage medium of claim 1, wherein scaling the one or more virtual objects comprises:

determining a size of each of the one or more virtual objects based on context information associated with the response;

determining a size and shape of at least one object within the background environment based on the geometry of the background environment; and adjusting the size of each of the one or more virtual objects based on the size and shape of the at least one object in the background environment.

11. The non-transitory computer-readable storage medium of claim 1, wherein the one or more virtual objects within the background environment are displayed based on one or more capabilities of the electronic device.

12. The non-transitory computer-readable storage medium of claim 1, wherein the one or more programs further comprise instructions, which when executed by the one or more processors of the electronic device, cause the device to:

receive a request from the user to move the one or more virtual objects within the background environment; and move the one or more virtual objects in accordance with the request from the user.

13. The non-transitory computer-readable storage medium of claim 1, wherein the background environment is a virtual environment or a real-world environment.

14. The non-transitory computer-readable storage medium of claim 13, wherein the real-world environment is a surrounding environment of the user providing the user request.

15. The non-transitory computer-readable storage medium of claim 13, wherein the virtual environment is a two-dimensional or three-dimensional image.

16. The non-transitory computer-readable storage medium of claim 1, wherein the one or more virtual objects are displayed on a portion of a user interface along with the user request and the response.

17. The non-transitory computer-readable storage medium of claim 1, wherein the one or more virtual objects are displayed on a first user interface, wherein the user request is displayed on a second user interface.

18. The non-transitory computer-readable storage medium of claim 1, wherein determining whether to present the visual representation of the response based on a user state.

19. The non-transitory computer-readable storage medium of claim 1, wherein determining the one or more virtual objects based on time it may take to display them to the user.

20. A method performed on an electronic device, the method comprising:

receiving, from a user, a user request;

in response to receiving the user request:
    determining a response for the user request;
    determining a format for a visual representation of the response;
    identifying one or more virtual objects based on the format for the visual representation of the response;
    determining a size for each of the one or more virtual objects based on context information associated with the response; and
    displaying the one or more virtual objects within a background environment based on the size for each of the one or more virtual objects and geometry of the background environment.

21. The method of claim 20, wherein the user request is a natural language input in form of a spoken or textual command presented at the electronic device.

22. The method of claim 20, wherein determining the format for the visual representation comprises:

prompting the user to select a format from a list of formats; and receiving, from the user, a format selected from the list of formats.

23. The method of claim 22, wherein determining the format for the visual representation comprises:
   determining a format from the list of formats based on user's historical format selections.

24. The method of claim 20, wherein the format for the visual representation includes at least one of a compact mode, a real-world environment mode and an immersive mode.

25. The method of claim 20, wherein each of the one or more virtual objects is a Graphical User Interface (GUI) component in a virtual three-dimensional space.

26. The method of claim 20, wherein displaying the one or more virtual objects within the background environment on the electronic device comprises:
   ranking the one or more virtual objects to be displayed within the background environment; and
   presenting the one or more virtual objects within the background environment in a sequence based on the ranking, wherein the one or more virtual objects are presented within a predetermined time-period.

27. The method of claim 20, wherein displaying the one or more virtual objects within the background environment on the electronic device comprises:
   creating an animation involving the one or more virtual objects within the background environment; and
   presenting the animation on a user interface within the electronic device.

28. The method of claim 20, wherein displaying the one or more virtual objects within the background environment comprises:
   scaling the one or more virtual objects based on a size associated with at least one object in the background environment; and
   presenting the one or more scaled virtual objects within the background environment.

29. The method of claim 20, wherein scaling the one or more virtual objects comprises:
   determining a size of each of the one or more virtual objects based on context information associated with the response;
   determining a size and shape of at least one object within the background environment based on the geometry of the background environment; and
   adjusting the size of each of the one or more virtual objects based on the size and shape of the at least one object in the background environment.

30. The method of claim 20, wherein the one or more virtual objects within the background environment are displayed based on one or more capabilities of the electronic device.

31. The method of claim 20, further comprising:
   receiving a request from the user to move the one or more virtual objects within the background environment; and
   moving the one or more virtual objects in accordance with the request from the user.

32. The method of claim 20, wherein the background environment is a virtual environment or a real-world environment.

33. The method of claim 32, wherein the real-world environment is a surrounding environment of the user providing the user request.

34. The method of claim 32, wherein the virtual environment is a two-dimensional or three-dimensional image.

35. The method of claim 20, wherein the one or more virtual objects are displayed on a portion of a user interface along with the user request and the response.

36. The method of claim 20, wherein the one or more virtual objects are displayed on a first user interface, wherein the user request is displayed on a second user interface.

37. The method of claim 20, wherein determining whether to present the visual representation of the response based on a user state.

38. The method of claim 20, wherein determining the one or more virtual objects based on time it may take to display them to the user.

39. An electronic device comprising:
   one or more processors;
   a memory; and
   one or more programs, wherein the one or more programs are stored in the memory and configured to be executed by the one or more processors, the one or more programs including instructions for:
      receiving, from a user, a user request;
      in response to receiving the user request:
         determining a response for the user request;
         determining a format for a visual representation of the response;
         identifying one or more virtual objects based on the format for the visual representation of the response;
         determining a size for each of the one or more virtual objects based on context information associated with the response; and
         displaying the one or more virtual objects within a background environment based on the size for each of the one or more virtual objects and geometry of the background environment.

40. The electronic device of claim 39, wherein the user request is a natural language input in form of a spoken or textual command presented at the electronic device.

41. The electronic device of claim 39, wherein determining the format for the visual representation comprises:
   prompting the user to select a format from a list of formats; and
   receiving, from the user, a format selected from the list of formats.

42. The electronic device of claim 41, wherein determining the format for the visual representation comprises:
   determining a format from the list of formats based on user's historical format selections.

43. The electronic device of claim 39, wherein the format for the visual representation includes at least one of a compact mode, a real-world environment mode and an immersive mode.

44. The electronic device of claim 39, wherein each of the one or more virtual objects is a Graphical User Interface (GUI) component in a virtual three-dimensional space.

45. The electronic device of claim 39, wherein displaying the one or more virtual objects within the background environment on the electronic device comprises:
   ranking the one or more virtual objects to be displayed within the background environment; and
   presenting the one or more virtual objects within the background environment in a sequence based on the ranking, wherein the one or more virtual objects are presented within a predetermined time-period.

46. The electronic device of claim 39, wherein displaying the one or more virtual objects within the background environment on the electronic device comprises:
   creating an animation involving the one or more virtual objects within the background environment; and
   presenting the animation on a user interface within the electronic device.

47. The electronic device of claim 39, wherein displaying the one or more virtual objects within the background environment comprises:
  scaling the one or more virtual objects based on a size associated with at least one object in the background environment; and
  presenting the one or more scaled virtual objects within the background environment.

48. The electronic device of claim 39, wherein scaling the one or more virtual objects comprises:
  determining a size of each of the one or more virtual objects based on context information associated with the response;
  determining a size and shape of at least one object within the background environment based on the geometry of the background environment; and
  adjusting the size of each of the one or more virtual objects based on the size and shape of the at least one object in the background environment.

49. The electronic device of claim 39, wherein the one or more virtual objects within the background environment are displayed based on one or more capabilities of the electronic device.

50. The electronic device of claim 39, the one or more programs further including instructions for:
  receiving a request from the user to move the one or more virtual objects within the background environment; and
  moving the one or more virtual objects in accordance with the request from the user.

51. The electronic device of claim 39, wherein the background environment is a virtual environment or a real-world environment.

52. The electronic device of claim 51, wherein the real-world environment is a surrounding environment of the user providing the user request.

53. The electronic device of claim 51, wherein the virtual environment is a two-dimensional or three-dimensional image.

54. The electronic device of claim 39, wherein the one or more virtual objects are displayed on a portion of a user interface along with the user request and the response.

55. The electronic device of claim 39, wherein the one or more virtual objects are displayed on a first user interface, wherein the user request is displayed on a second user interface.

56. The electronic device of claim 39, wherein determining whether to present the visual representation of the response based on a user state.

57. The electronic device of claim 39, wherein determining the one or more virtual objects based on time it may take to display them to the user.

* * * * *

UNITED STATES PATENT AND TRADEMARK OFFICE
CERTIFICATE OF CORRECTION

PATENT NO. : 12,136,172 B2
APPLICATION NO. : 17/945963
DATED : November 5, 2024
INVENTOR(S) : Shiraz Akmal et al.

Page 1 of 1

It is certified that error appears in the above-identified patent and that said Letters Patent is hereby corrected as shown below:

In the Claims

In Column 70, Line 10, Claim 12, delete "by the" and insert -- by --, therefor.

Signed and Sealed this
Eighteenth Day of March, 2025

Coke Morgan Stewart
*Acting Director of the United States Patent and Trademark Office*